Feb. 26, 1963   R. A. HUNT ETAL   3,078,770
XEROGRAPHIC REPRODUCING APPARATUS
Filed Aug. 1, 1960   18 Sheets-Sheet 1

INVENTOR.
ROBERT A. HUNT
GORDON P. TAILLIE
BY

ATTORNEY

INVENTOR.
ROBERT A. HUNT
GORDON P. TAILLIE
BY
ATTORNEY

INVENTOR.
ROBERT A. HUNT
GORDON P. TAILLIE
BY
ATTORNEY

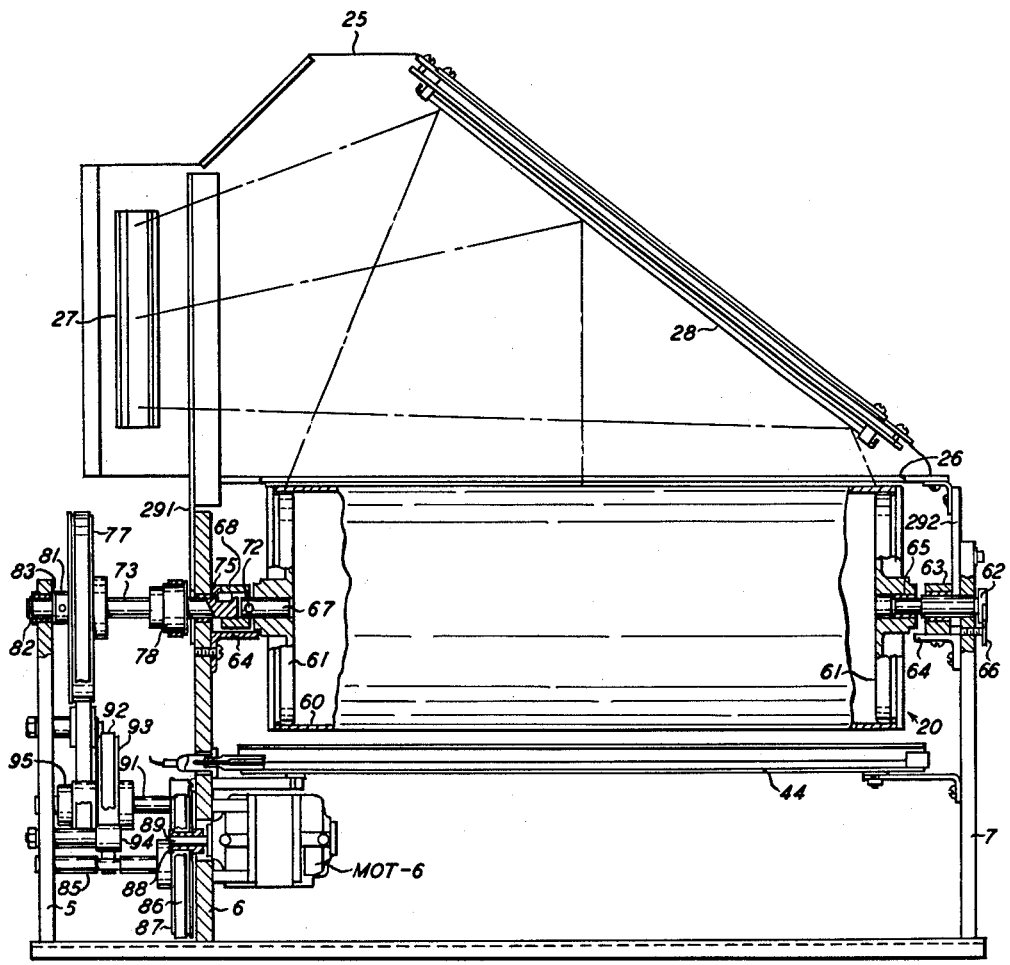
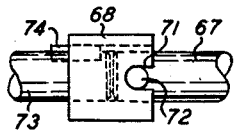
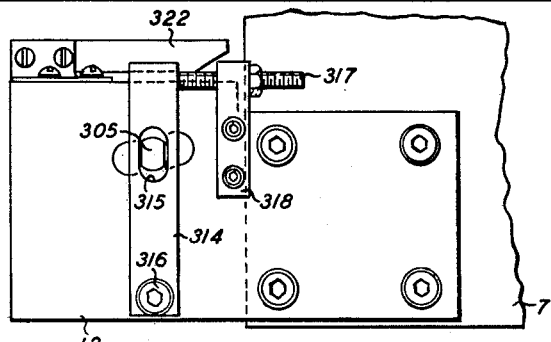
FIG. 5
FIG. 6
FIG. 7
INVENTOR.
ROBERT A. HUNT
GORDON P. TAILLIE

INVENTOR.
ROBERT A. HUNT
GORDON P. TAILLIE
BY
ATTORNEY

Feb. 26, 1963   R. A. HUNT ETAL   3,078,770
XEROGRAPHIC REPRODUCING APPARATUS
Filed Aug. 1, 1960   18 Sheets-Sheet 10

INVENTOR.
ROBERT A. HUNT
GORDON P. TAILLIE
BY
ATTORNEY

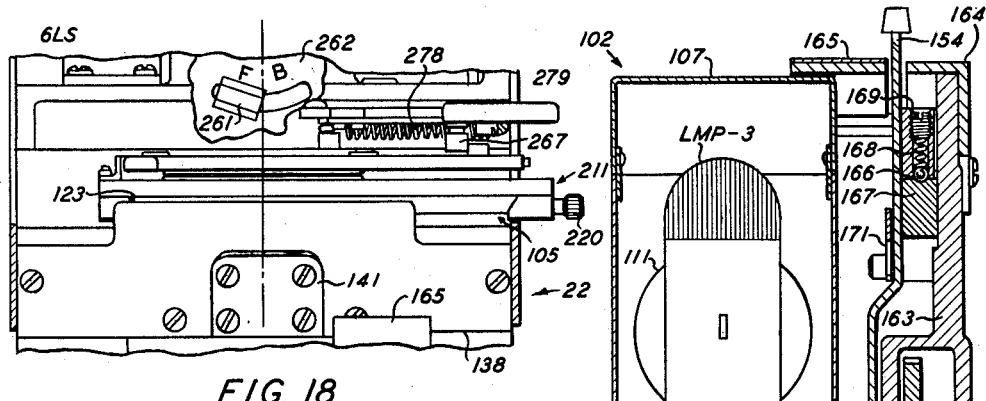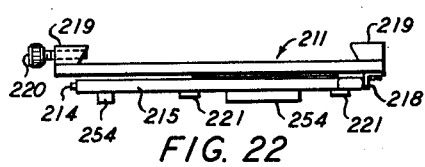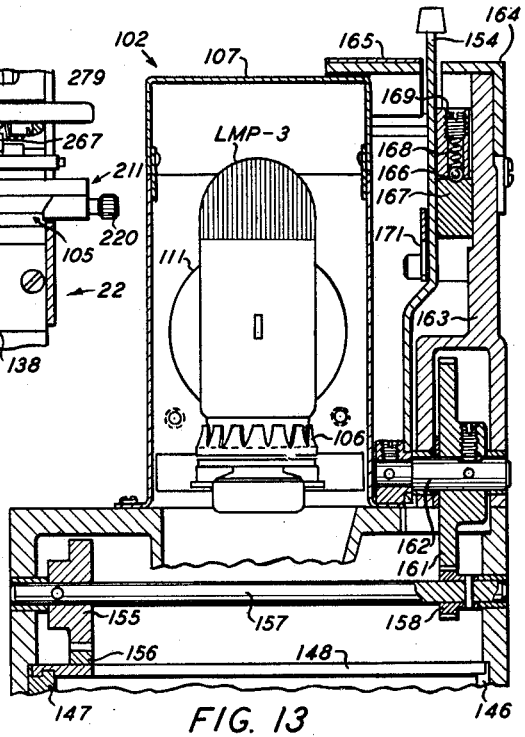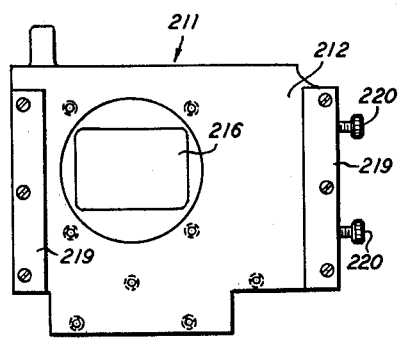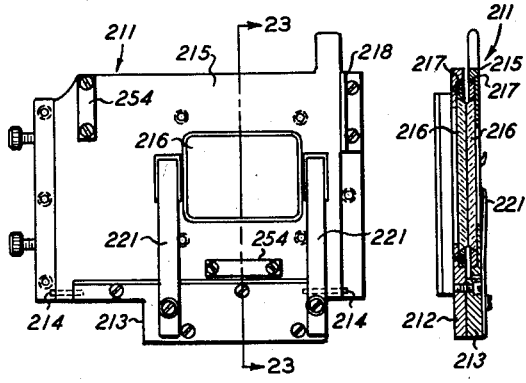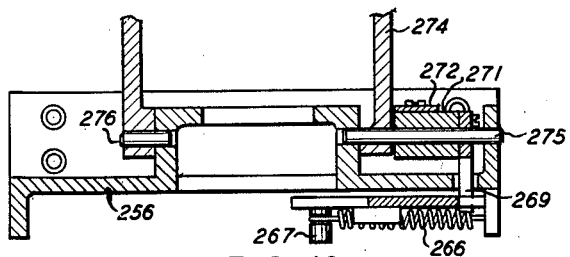

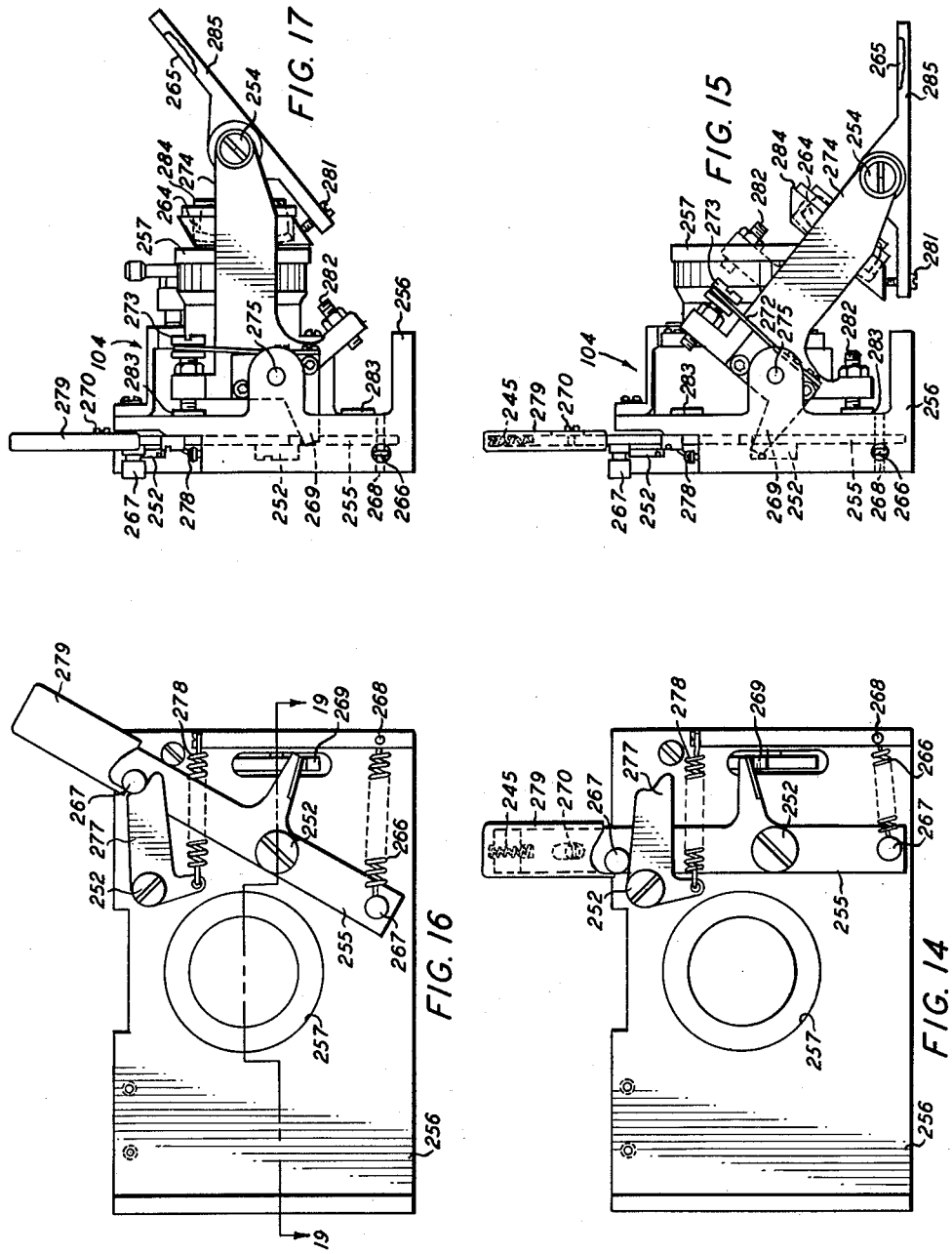

Feb. 26, 1963 R. A. HUNT ETAL 3,078,770
XEROGRAPHIC REPRODUCING APPARATUS
Filed Aug. 1, 1960 18 Sheets-Sheet 13

INVENTOR.
ROBERT A. HUNT
GORDON P. TAILLIE
BY
ATTORNEY

INVENTOR.
ROBERT A. HUNT
GORDON P. TAILLIE
BY
ATTORNEY

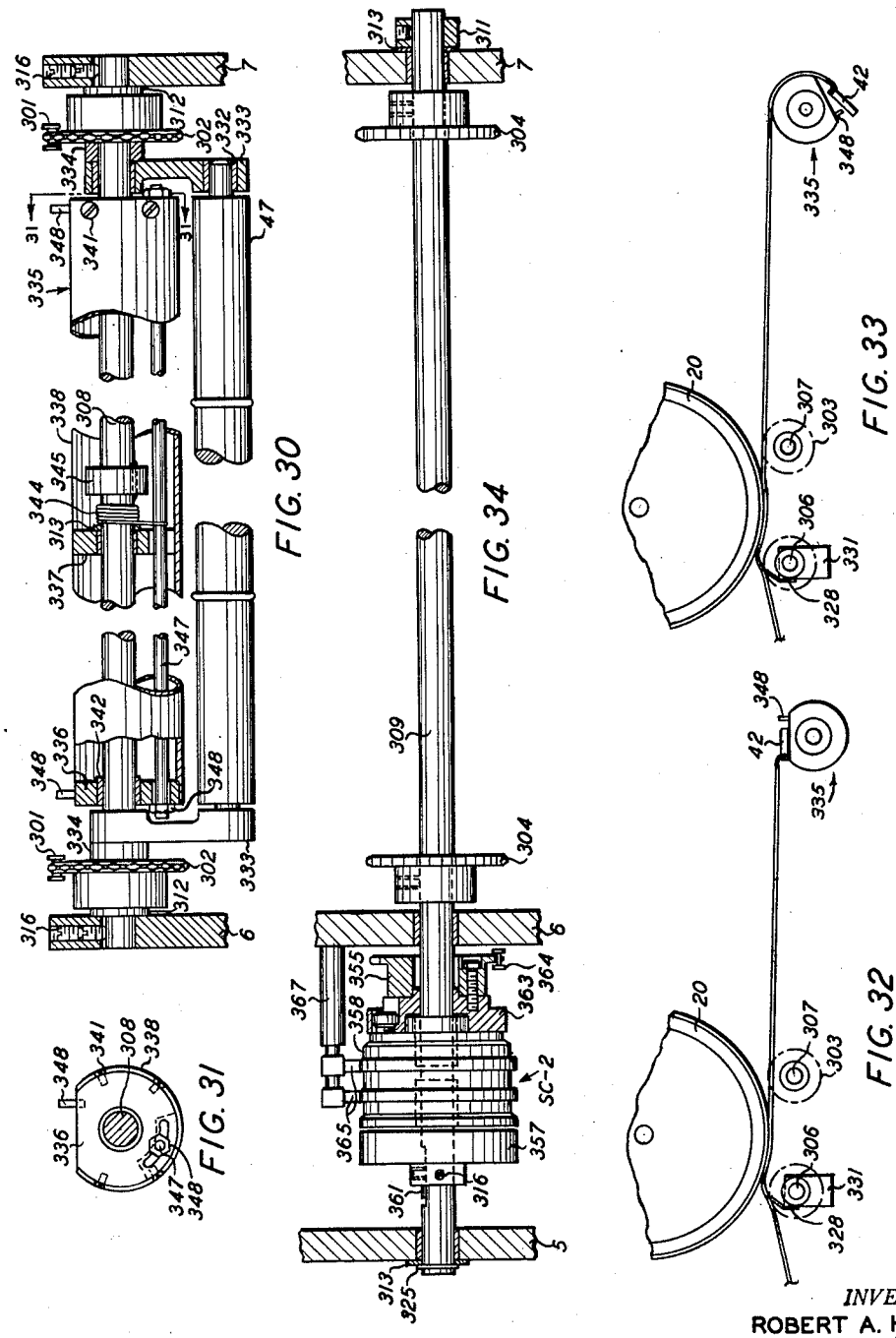

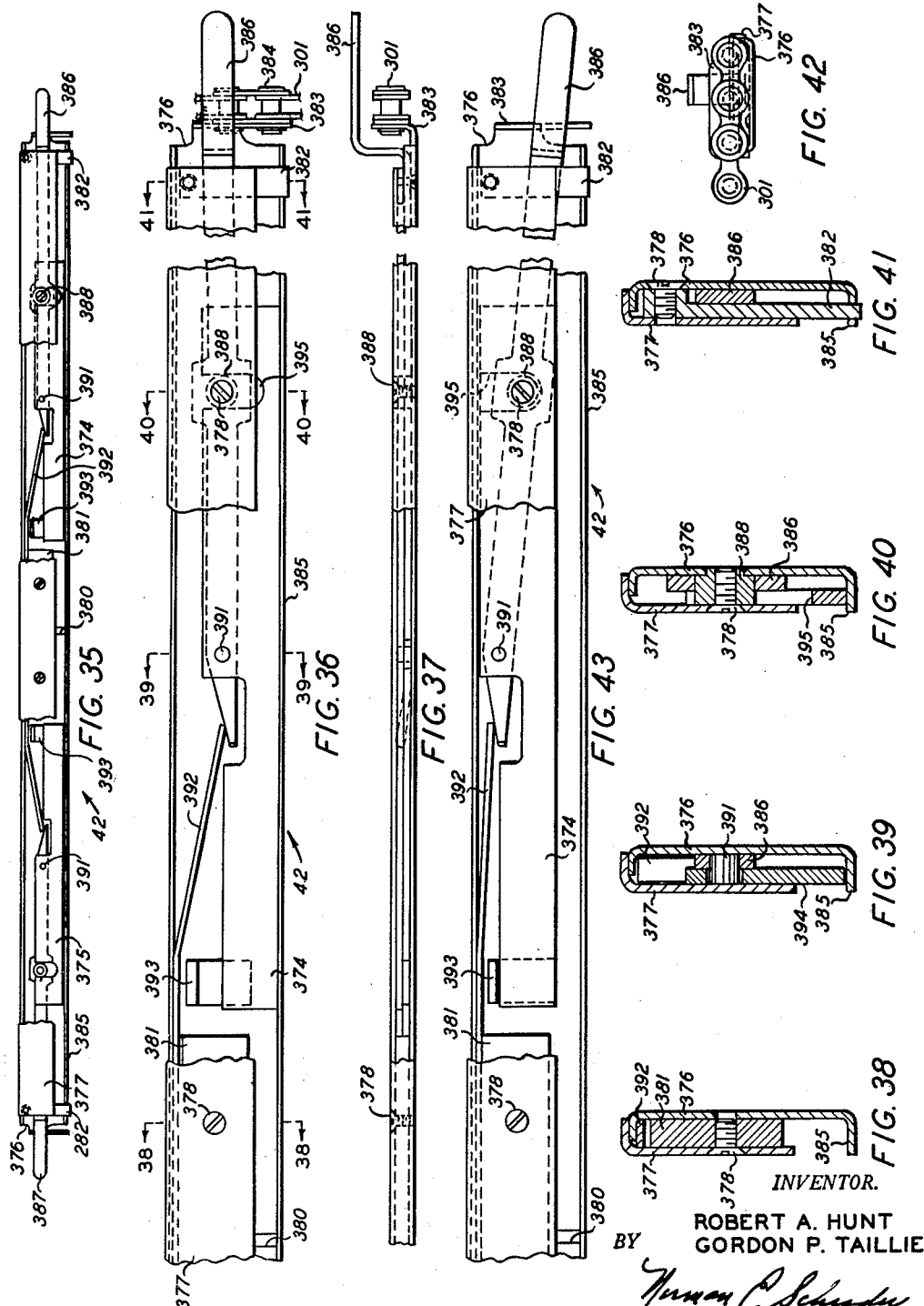

INVENTOR.
ROBERT A. HUNT
GORDON P. TAILLIE

3,078,770
XEROGRAPHIC REPRODUCING APPARATUS
Robert A. Hunt, Wilbraham, Mass., and Gordon P. Taillie, Rochester, N.Y.; said Hunt assignor to Xerox Corporation, a corporation of New York
Filed Aug. 1, 1960, Ser. No. 46,463
5 Claims. (Cl. 95—1.7)

This invention relates in general to xerography and, in particular, to an improved xerographic reproducing apparatus.

More specifically, the invention relates to an improved automatic xerographic apparatus for use in producing xerographic reproductions from microfilm, whether in the form of a single frame of microfilm mounted in a data processing card or in the form of roll film.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electroscopic powder, hereinafter referred to as toner, and a granular carrier material, which latter functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into surface contact with the photoconductive coating of the xerographic plate and is held thereon electrostatically in a pattern corresponding to the electrostatic latent image. Thereafter, the developed xerographic image is usually transferred to a support or transfer material to which it may be fixed by any suitable means.

Since the disclosure of the basic concept of xerography by Carlson, a variety of machines and devices have been proposed to incorporate such teachings in a manner to form copy xerographically on a commercial basis. For the most part, each of such devices has been specifically designed to the solution of a particular reproduction problem, and, for the most part, has been limited to the particular use intended. Thus, for example, machines are presently in wide commercial use for the continuous high-speed enlargement of microfilm in roll form, and for enlarging and reducing from opaque originals.

Although as useful as these machines may be, as evidenced by their commercial acceptance, none can be considered to be of general application of the type required in the microfilm art. For example, prior art machines whether based on the xerographic reproduction techniques or other reproduction techniques, are usually limited as to the type of original that may be used therewith, or as to the type and size of transfer material that can be employed therein, or as to the flexibility of operation of the machine itself.

It is, therefore, the principal object of this invention to improve xerographic reproducing apparatus for microfilm enlarging, the xerographic apparatus being capable of making copies xerographically, automatically, economically and accurately.

Another object of this invention is to improve upon xerographic apparatus for the production of hard copy prints in selected size from unitized microfilm mounted in aperture data processing cards, or from microfilm in roll form.

Another object of this invention is to improve xerographic apparatus of the rotary type whereby the operations of the device are effected independently of the rotary position of a xerographic plate to permit more efficient use of the plate surface.

Another object of this invention is to improve xerographic apparatus in a manner such that the various operating cycles are effected in timed relation to the insertion of a sheet of transfer material, on which the reproduction is to be made, into the machine.

A further object of this invention is to improve xerographic apparatus for making single enlargements from microfilm onto cut sheets of transfer material.

These and other objects of the invention are attained by means of a charging device, a projection device for scanning copy to be reproduced, a developer mechanism, a sheet conveyor mechanism, a transfer charging device, a fuser mechanism, and a plate cleaner, all operatively positioned around a rotatably journaled xerographic drum, each of the above elements being suitably driven and controlled to permit coordinated operation of the apparatus to reproduce a copy from microfilm automatically.

For a better understanding of the invention as well as other objects and further features thereof, reference is had to the following detailed description of the invention to be read in connection with the accompanying drawings, wherein:

FIG. 5 is a sectional view taken along line 5—5 of FIG. 3;

FIG. 6 is an enlarged view of the xerographic drum drive coupling;

FIG. 7 is an enlarged side view of a frame extension plate and the elements attached thereon;

FIG. 13 is a sectional view taken along line 13—13 of FIG. 9;

FIG. 14 is a rear view of the projection lens assembly shown in its normal operating position;

FIG. 15 is a side view of the projection lens assembly in its normal operating position;

FIGS. 16 and 17 are rear and side views, respectively, of the projection lens assembly with the carrier lever positioned to bring a viewing lens and viewing object mirror into alignment with the axis of the projection lens assembly;

FIG. 18 is a top view, in part, of the projector assembly illustrating the position of the various elements thereon when the carrier lever is actuated to the position in FIG. 16;

FIG. 19 is a sectional view of the projection lens assembly taken along the line 19—19 of FIG. 16;

FIG. 20 is a front view of the card copy carrier;

FIG. 21 is a rear view of the card copy holder;

FIG. 22 is a top view of the card copy holder;

FIG. 23 is a sectional view of the card copy holder taken along line 23—23 of FIG. 20;

FIG. 30 is a sectional view of the paper guide roll and delivery idler roller taken along line 30—30 of FIG. 3;

FIG. 31 is a sectional view of the paper guide roll taken along line 31—31 of FIG. 30;

FIGS. 32 and 33 illustrate schematically the operation of the paper guide roll;

FIG. 34 is a sectional view of the conveyor drive assembly taken along line 34—34 of FIG. 3;

FIG. 35 is a top view of a paper gripper;

FIG. 36 is an enlarged top view of a portion of the paper gripper of FIG. 35;

FIG. 37 is an enlarged rear view of the paper gripper of FIG. 36;

FIG. 38 is an enlarged sectional view of the paper gripper taken along line 38—38 of FIG. 36;

FIG. 39 is an enlarged sectional view of the paper gripper taken along line 39—39 of FIG. 36;

FIG. 40 is an enlarged sectional view of the paper gripper taken along line 40—40 of FIG. 36;

FIG. 41 is an enlarged sectional view of the paper gripper taken along line 41—41 of FIG. 36;

FIG. 42 is an enlarged end view of the paper gripper;

FIG. 43 is a view similar to FIG. 35 showing the gripper bars of the paper gripper in an open position;

Figure 1:
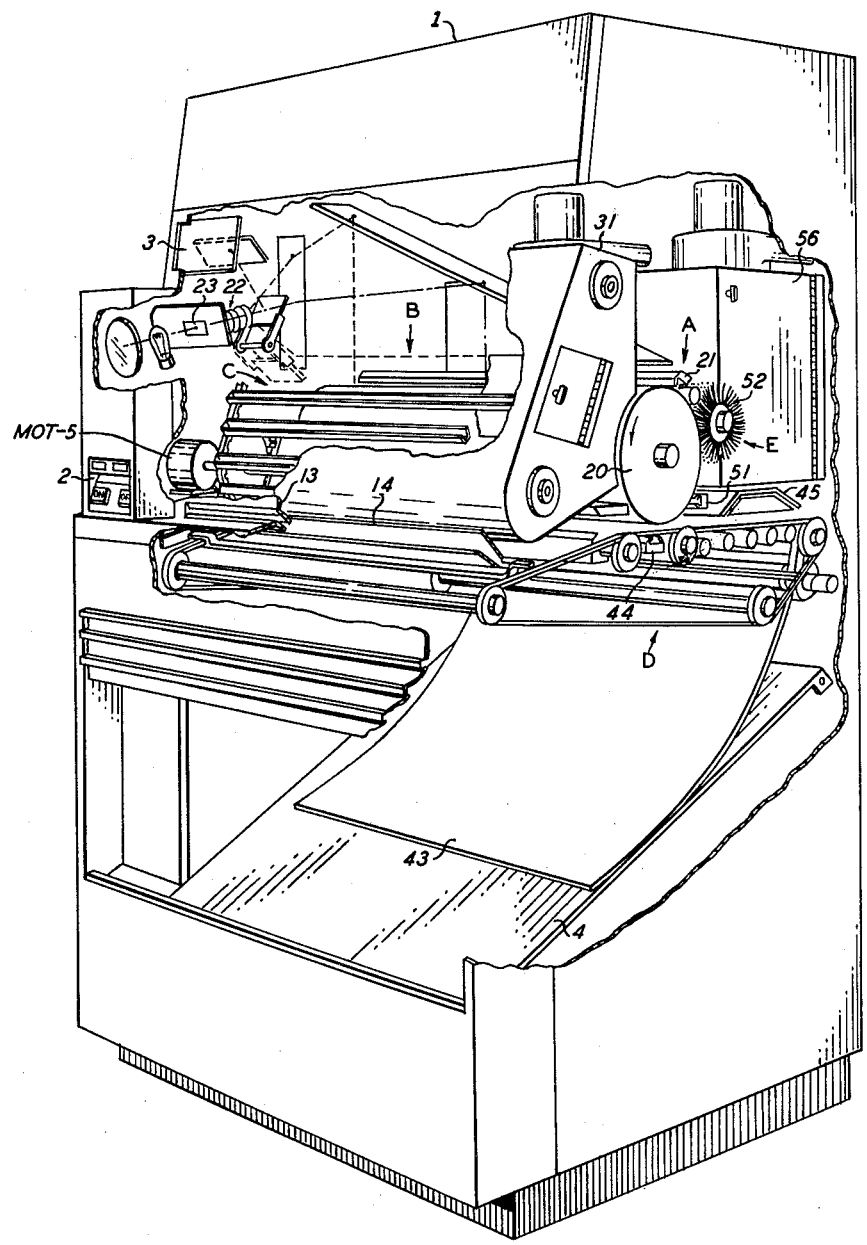
FIG. 1 is a right-hand perspective view of the xerographic apparatus of the invention enclosed within a cabinet, with parts of the cabinet covering broken away to show the arrangement of the xerographic machine elements schematically.

Referring now to the drawings, there is shown in FIG. 1 a xerographic reproducing machine used for producing xerographic reproductions from microfilm, whether in the form of a continuous web or in the form of an individual frame mounted on a suitable apertured card. To conform to modern office decor the xerographic apparatus is adapted for installation in a suitable console or cabinet.

The cabinet, generally designated 1, constructed in a conventional manner, has mounted on the left-hand side thereof a main control panel 2 for initiating operation of the machine. Positioned directly above the control panel, is a viewing platen or screen 3 described in detail hereinafter. In the embodiment disclosed, the cabinet of conventional construction, serves as a light-tight housing for the xerographic apparatus. As shown, the xerographic apparatus is positioned in the upper portion of the cabinet, the lower portion of the cabinet having a recessed inclined collecting tray 4 for finished reproductions.

Figure 2:
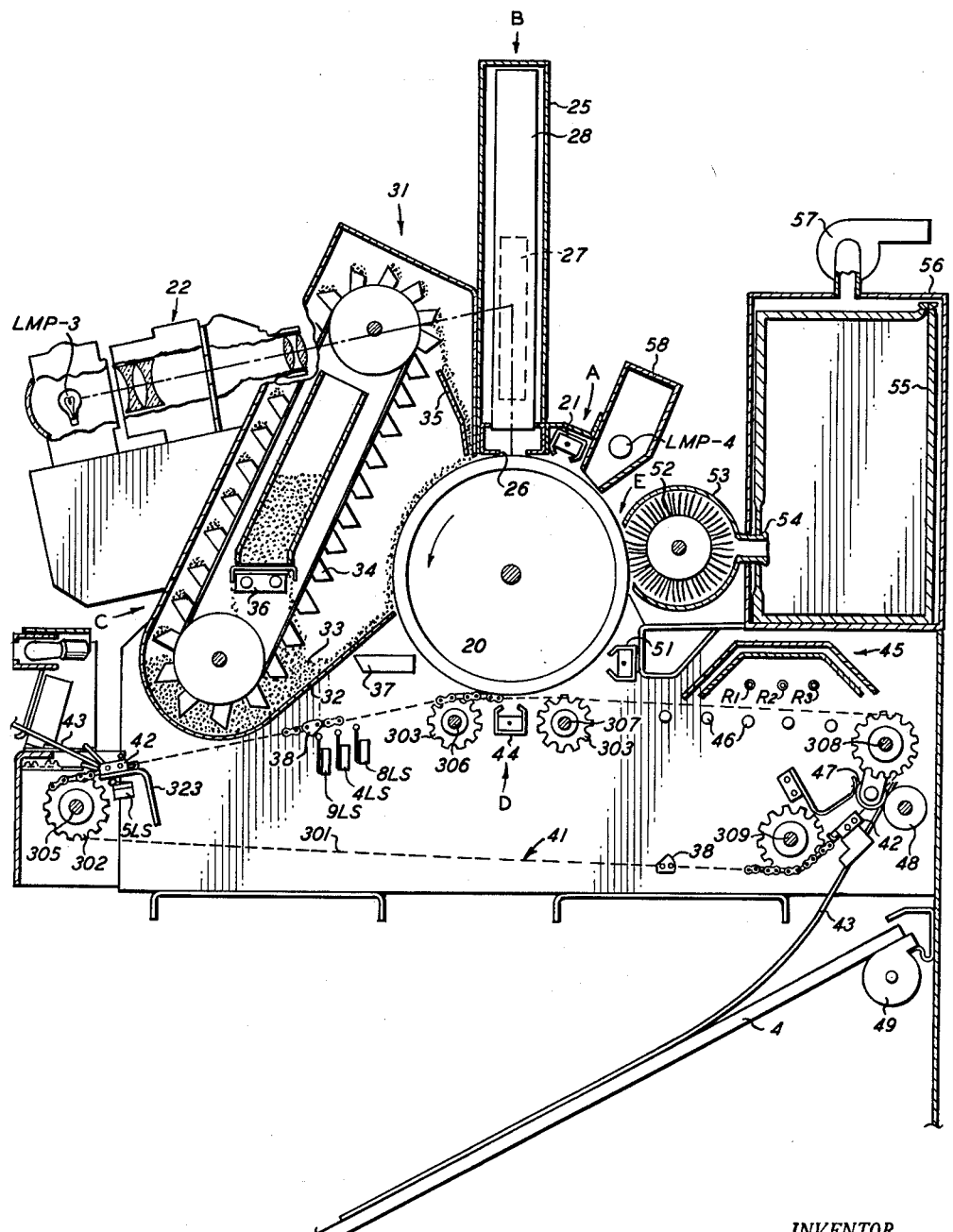
FIG. 2 illustrates schematically a preferred embodiment of the xerographic apparatus of the invention.

As shown in FIGS. 1 and 2, the xerographic apparatus comprises a xerographic plate including a photoconductive layer or light-receiving surface on a conductive backing and formed in the shape of a drum, generally designated by numeral 20, which is journaled in the frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum; an exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is first charged and then brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus or corona charging device 21 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project an image onto the surface of the photoconductive xerographic drum from a suitable original. To permit the utilization of copy in the form of microfilm either in a continuous web or as individual frames mounted in suitable apertured cards, the optical projection system shown includes a projector of the type disclosed in copending application, Serial No. 46,435, filed concurrently herewith on August 1, 1960, in the name of Rutkus et al.

The optical scanning or projection mechanism includes a projector 22 having a movable carriage for transporting a film holder in light-projecting relation to the moving light-sensitive surface of the xerographic drum. Uniform lighting of an object, such as film 23, is provided by means of a projection lamp LMP-3.

A light shield 25 adapted to protect the xerographic drum from extraneous light at the exposure station is positioned adjacent to the surface of the xerographic drum. A slot aperture 26 in the light shield extends transversely to the path of movement of the light-receiving surface of the xerographic drum to permit reflected rays from the film to be directed against a limited transverse area of the light-receiving surface as it passes therebeneath. To enable the projector 22 to be mounted on the front of the machine, for operator convenience, a folded optical system including an object mirror 27, and an image mirror 28, is used in the preferred embodiment of the invention, the object mirror and image mirror being mounted in the light shield. The film holder, supported by the movable carriage of the projector, is arranged for movement in a path to transverse the optical path of the lens whereby the subject image of the film is scanned in timed relation to the movement of the light-receiving surface of the xerographic drum to project a light image corresponding to the subject image onto the surface of the xerographic drum.

Adjacent to the exposure station is a developing station C in which there is positioned a developer apparatus 31 including a developer housing 32 having a lower or sump portion for accumulating developer material 33. Mounted within the developer housing is a bucket-type conveyor 34 driven by a motor MOT–5, the conveyor being used to carry the developer material previously supplied to the developer housing to the upper portion of the developer housing from where the developer material is cascaded over a hopper chute 35 onto the drum.

As the developer material cascades over the drum, toner particles of the developer material adhere electrostatically to the previously formed electrostatic latent image areas on the drum to form a visable xerographic powder image, the remaining developer material falling off the peripheral surface of the drum into the bottom of the developer housing. Toner particles consumed during the developing operation to form the xerographic powder images are replenished by a toner dispenser 36, of the type disclosed in copending Hunt application, Serial No. 776,976, filed November 28, 1958, now Patent No. 3,013,703, mounted within the developer housing and driven by motor MOT–5 through a suitable drive mechanism (not shown).

It is believed that the foregoing description of the developer apparatus and toner dispenser is sufficient for the purposes of this application since the specific details of these elements are not pertinent to subject matter of this application.

Any developing material not caught within the developer housing as the developer material falls from the drum is caught by a pan 37 suitably positioned beneath the developer housing. As a supply of developing material accumulates in this pan it is manually removed by an operator and it may be returned to the reservoir in the developer housing.

Positioned next and adjacent to the developing station is the image transfer Station D which includes suitable sheet feeding mechanism adapted to feed sheets of support or transfer material, usually paper, successively to the xerographic drum in registration with the formed xerographic powder image on the xerographic drum.

In the embodiment shown, the sheet feeding mechanism includes a chain conveyor 41 carrying a pair of paper grippers 42 in a circuit between sheet receiving and sheet delivery stations, means being provided to actuate the paper grippers to cause the paper grippers to take hold of the front or leading edge of a sheet of support material 43 inserted into the machine at the receiving station at the front of the machine and to hold the sheet while traveling to the delivery station and there to release the sheet for discharge from the machine.

In the embodiment shown, a sheet of transfer material fed manually by an operator to a paper gripper 42 is forwarded by the paper gripper into contact with the xerographic drum.

The transfer of the xerographic powder image from the drum surface to the support material is effected by means of a corona transfer device 44 that is located at or immediately after the point of contact between the support material and the rotating drum. The corona transfer device is substantially similar to the corona discharge device 21 that is employed at charging station A, in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere to electrostatically to the surface of the transfer material.

As the paper gripper is advanced by the chain conveyor it will strip the sheet of transfer material from the drum and transport it to a suitable fixing device, such as heat fuser 45, whereat the xerographic powder images previously transferred to the sheet are permanently fixed thereto, suitable rods 46 being provided to guide the trailing edge of a sheet of support material in a path adjacent to the heat fuser. The heat fuser 45 contains suitable electrical heating elements R–1, R–2 and R–3 connected to a suitable source of power as described in detail hereinafter.

Figure 44:
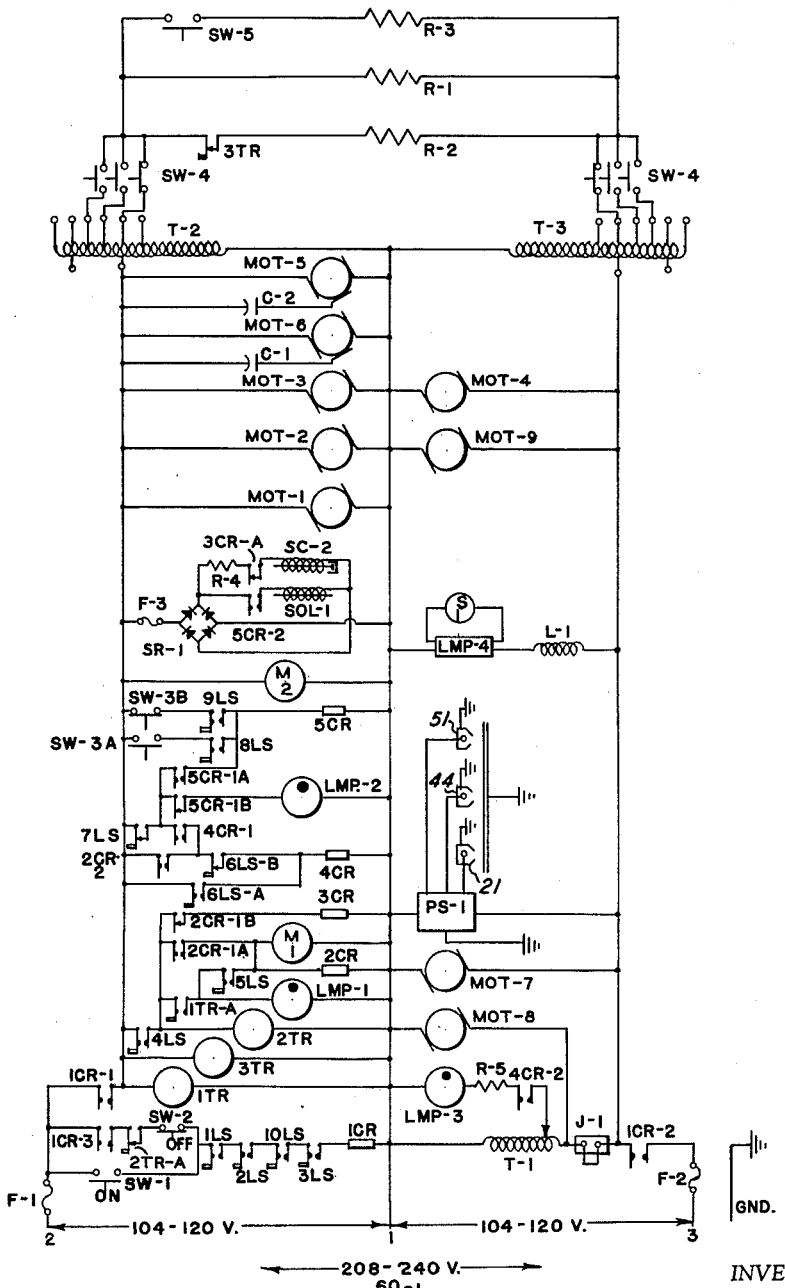
FIG. 44 is a schematic electrical wiring diagram of the xerographic apparatus.
Figure 45:
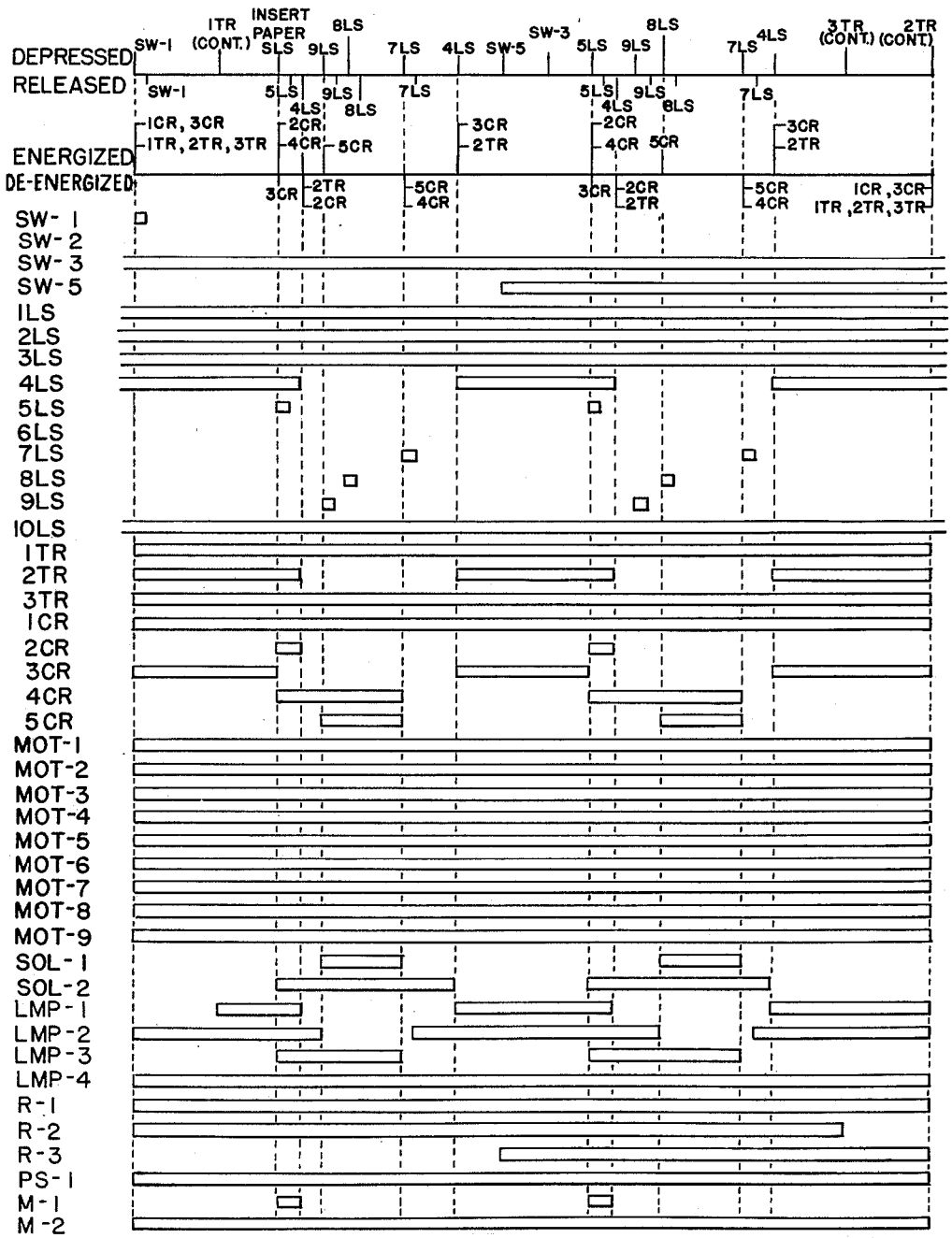
FIG. 45 is a timing chart of the operation of the elements of the xerographic apparatus.

After fusing, the finished copy is discharged from the apparatus at a suitable point for collection. To accomplish this, there is provided a pair of delivery rollers 47 and 48 which receive the sheet from a paper gripper and deliver it to collecting tray 4. Since an electrostatic charge may be retained by the sheet during the transfer process a motor MOT–1, not shown except schematically in FIG. 44, driven blower 49 is positioned to direct a flow of aeriform fluid between the collecting tray and a sheet delivered thereto, thus in effect forming an air bearing on which the sheet will slide by gravity down the inclined collecting tray 4.

The next and final station is the device is a drum cleaning station E, having positioned therein a corona pre cleaning device 51 similar to the corona charging device 21, to impose an electrostatic charge on the drum and powder adherent thereto to aid in effecting removal of the powder, a rotatable brush 55 to effect removal of this residual powder from the drum, and a source of light, such as lamp LMP–4 to flood the drum surface with light to cause dissipation of any residual electrical charge remaining on the xerographic drum.

For collecting powder particles removed from the brush there is provided a dust hood 53 that is formed to encompass approximately two-thirds of the brush area.

For removing dust particles from the brush and dust hood, an exhaust duct 54 is arranged to cover a slot that extends transversely across the dust hood 53 and is connected to a filter bag 55 in a filter box 56. Motor-driven fan units 57, connected to the filter box, produce a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor fan unit.

Any residual electrical charge remaining on the xerographic drum is dissipated by light from a fluorescent lamp LMP–4 mounted in a suitable lamp housing 58, a starter being provided for energizing the fluorescent lamp.

The drum, the projection apparatus and the paper conveyor are driven at predetermined speeds relative to each other by MOT–6 through a suitable drive mechanism described hereinafter. The drum is driven continuously, while both the paper conveyor and the projection apparatus are driven intermittently as described hereinafter.

Operation of the paper conveyor is effected by actuation of a limit switch 5LS upon the insertion of a sheet of transfer material into a paper gripper, and the operation of the paper conveyor is terminated, after a sheet of transfer material has been conveyed from the front of the machine to the delivery rollers, when limit switch 4LS is actuated by one of a pair of actuators 38 on the paper conveyor. As the paper conveyor is operated the other actuator 38 thereon, contacts limit switches 8LS and 9LS which are used to effect the operation of the projection apparatus as described hereinafter.

The brush cleaner 52 is operated by means of a motor MOT–7, and the developer apparatus 31 including the toner dispenser 36 is operated by means of a motor MOT-5, as previously described. The motor-driven fan units 57 are driven by a pair of motors designated MOT-2 and MOT-3. Another pair of fan units 59, only one of which is shown, are driven by motors MOT-4 and MOT-9, shown schematically in the electrical circuit, and are used to dissipate heat within the cabinet and, in particular, in the areas surrounding the heat fuser 45 and the drum 20. Heat from the projection lamp is dissipated by a motor MOT-8 driven fan unit shown schematically in the electrical circuit.

*Corona Generating Device*

In general, the electrostatic charging of the xerographic plate in preparation for the exposure step, the electrostatic charging of the support surface to effect transfer and the charging of the xerographic plate to aid in effecting removal of residual toner particles from the xerographic plate by the cleaning apparatus are accomplished by means of corona generating devices whereby an electrostatic charge is applied to the respective surfaces.

Although any one of a number of types of corona generating devices may be used, a corona generating device of the type disclosed in Vyverberg Patent 2,836,725 is used in each instance for the corona charging device 21, the corona transfer device 44 and the corona pre-clean device 51, each being secured to suitable support elements and connected to an electrical circuit described hereinafter.

Referring now to the figures, there is shown the general arrangement of the xerographic apparatus. For supporting the components of the xerographic apparatus there is provided a frame formed by left-hand plate 5, intermediate plate 6, and right-hand plate 7 connected together and maintained rigidly in spaced parallel relation to each other by suitable tie plates, as for example, channels 8. In the preferred embodiment of the apparatus, this frame assembly is supported within the cabinet by the cabinet frame (not shown). Both the intermediate plate 6, and the right hand plate 7 have secured thereto extension plates 11 and 12, respectively for a purpose described hereinafter.

Figure 4:
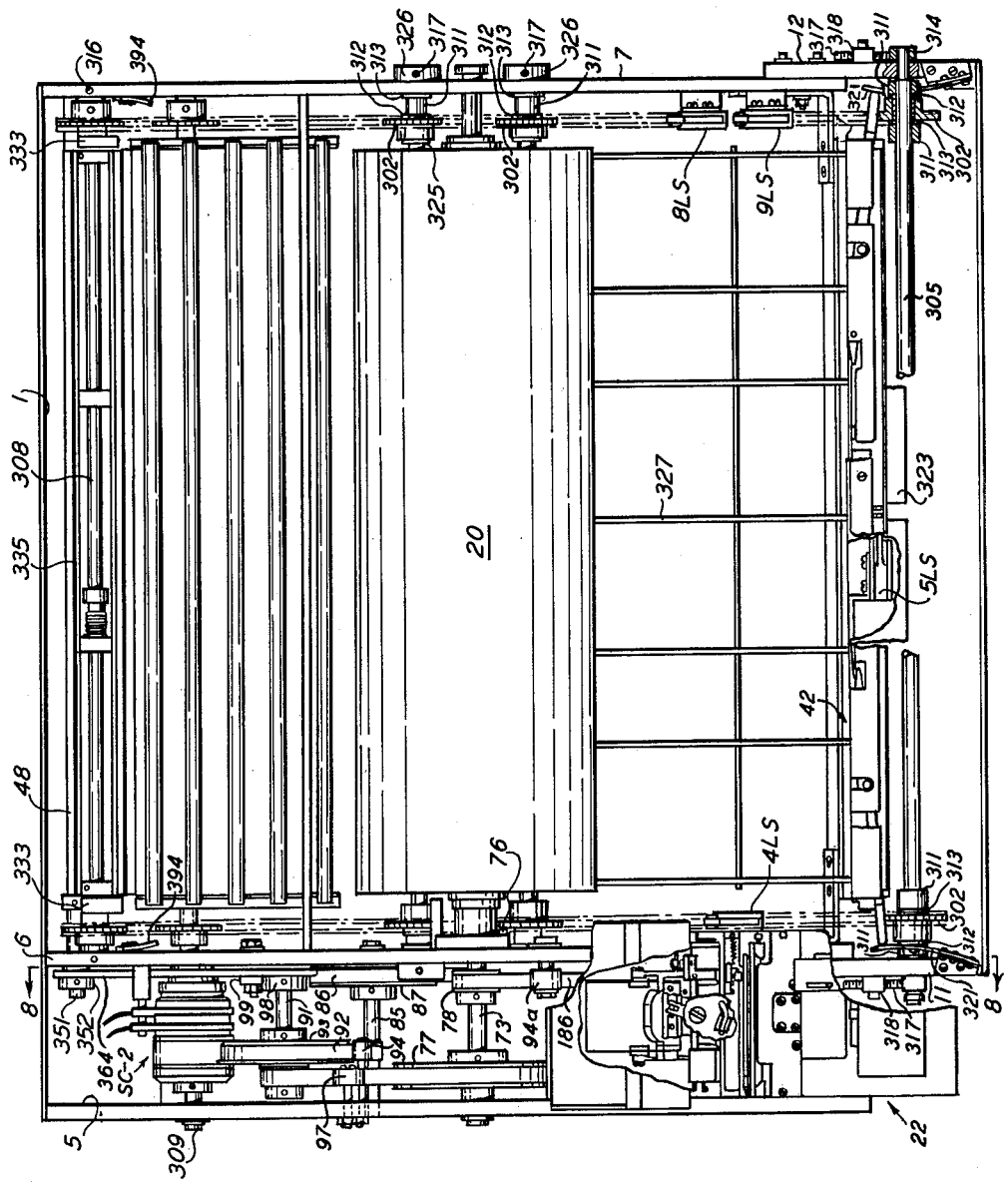
FIG. 4 is a top view of the xerographic apparatus with parts removed to clearly show the drive and paper conveyor components of the apparatus.
Figure 8:
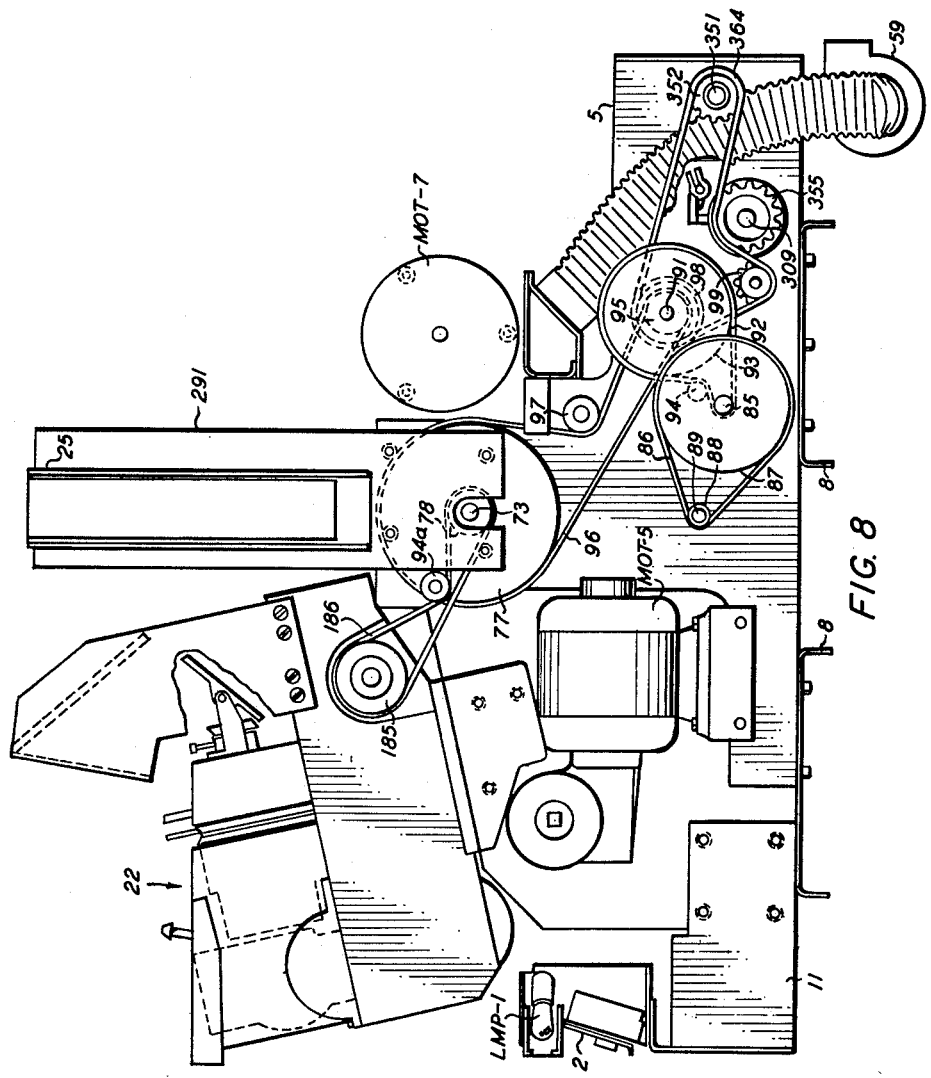
FIG. 8 is a sectional view of the xerographic drive elements taken along the line 8—8 of FIG. 4.

As shown in FIGS. 4 and 5 the drum 20, consisting of a cylinder 60 suitably supported by end flanges 61, is movably mounted between the frame plates 6 and 7. To removably support the drum on its right side as seen in FIG. 5, there is provided a removable stud shaft 62 suitably journaled in the right hand plate 7 and in a bearing block 63 supported by rail 64 secured to plate 7. One end of the stud shaft 62 is also removably journaled in the bearing 65 positioned in the right hand end flange of the drum, and is prevented from backing out of the drum by means of a lock screw 66, threaded into the plate 7, with the head of the lock screw in interference relationship with the head of the stud shaft 62.

For supporting the other side of the drum the left-hand end flange 61 has secured therein a stud shaft 67. To support the stud shaft 67 and to permit it to be driven from a suitable power source there is provided a coupling 68 adapted to receive the protruding end of the stud shaft 67. The coupling 68 is provided with a groove 71 on a face thereof to receive a drive pin 72 inserted therein and into an aperture on the end of the stud shaft 67. The coupling 68 is secured to a drum drive shaft 73 suitably journaled in the frame plates 5 and 6. Although the key 74 secures the coupling 68 to the drum shaft for rotation therewith, the coupling is free to move axially along the length of the shaft thereby permitting the coupling to be disengaged from the stud shaft 67 after the removal of drive pin 72 whereby this end of the drum may be disengaged from its support for removal from the apparatus. The coupling is normally positioned for engagement with the stud shaft 67 by means of a bearing spacer 75 pivotally secured to the plate 6 by screw 76, and when in position to act as a spacer between the coupling and plate 6, one end of the bearing spacer rests on a second rail 64 attached to plate 6 whereby the bearing spacer is supported out of contact with the drum shaft 73.

Secured to the drum shaft for rotation therewith is a drum drive pulley 77 and an optical drive pulley 78. Axial alignment of the drum shaft and the pulleys thereon is maintained by means of a collar 81 and thrust washer 83 positioned between drum drive pulley 77 and the right side of frame plate 5, and by a retaining ring 82 positioned in a suitable groove on the left-hand end of the drum shaft, as seen in FIGURE 5. The drum is driven by a main drive motor MOT-6 through a suitable drive mechanism described hereinafter.

*Exposure Mechanism*

The exposure mechanism of the xerographic copier duplicator of this invention is adapted to scan the object to be reproduced and to project an enlarged flowing image of the object onto the rotating xerographic drum in synchronization with the rotation of the xerographic drum.

Although any suitable exposure mechanism or projector may be used to expose the photoconductive surface of the drum to a radiation image of the copy to be reproduced, an optical scanning mechanism or projector 22 of the type disclosed in copending application, S.N. 46,435, filed concurrently herewith on August 1, 1960 in the name of Rutkus et al., is used in the preferred embodiment of this invention. In this type of projection apparatus the scanning of the object, which may be either microfilm frames mounted in apertures of data processing cards or roll microfilm, is accomplished by means of a movable carriage supporting the object to be reproduced which is moved relative to an optical system in synchronization with the rotation of the xerographic drum.

Specifically referring to FIGS. 9 to 28, inclusive, the optical scanning mechanism or projector 22 includes a main projector casing 101 which can be formed as an integral part of the main frame of the apparatus or formed as a separate element secured to the frame of the apparatus, as shown, for supporting a lamp assembly 102, a condenser lens assembly 103, and a projector lens assembly 104, in alignment with each other, and a carriage 105 for the copy to be scanned.

In the description of the projector, when reference is made to the front of the projector, it is to be understood that this means the output end or lens end of the projector without refernce to its location on the xerographic apparatus.

The lamp assembly 102 includes a projector lamp LMP-3 positioned in a conventional lamp socket and bracket assembly 106 suitably supported and connected to an electrical circuit described in detail hereinafter. Both the lamp and the lamp socket and bracket assembly are partially enclosed by a lamp housing 107 having secured thereto a conventional reflector 111 and a heat absorbing filter 112.

The lamp assembly is secured to the top of the main projector casing with the lamp housing positioned over an opening therein which serves as a conduit connecting the outlet 114 of a motor MOT-8 driven blower unit 115 used to dissipate heat generated by the projection lamp LMP-3. When the projection lamp is energized, light from this lamp passes through the lenses 116, 116a, 116b, and 116c, of a condenser lens assembly 103 to illuminate the copy to be reproduced. The condenser lenses are suitably spaced and aligned within a condenser lens housing 117 and secured therein by lock ring 118 and lens cover 121.

Copy to be scanned, such as, for example, microfilm carried in a suitable copy holder as described hereinafter, is supported on a carriage 105 for movement in a plane perpendicular to the axis of the condenser lenses whereby copy is scanned to project a flowing image of the object through the projection lens assembly 104.

The carriage 103 consists of an apertured carriage plate 122 having vertical dovetail guides 123 formed thereon for supporting a copy holder. The carriage plate is movably supported by a bearing block 125 secured thereto riding on a carriage shaft 124 secured in the side walls of the projector casing, the bearing block being suitably journaled on the shaft by means of bushings 126.

The carriage is driven in one direction to scan the object to be copied by means of a scan bar 127 adapted to be forced into friction contact with a continuously rotating roller 128. The scan bar 127 is secured to a holder 131 the holder being pivotally secured to the carriage plate by means of a scan bar stud 132 passing through the bearing block 125 and the holder 131, the end of the scan bar stud extending beyond the edge of the holder to receive a washer 134 and a retaining ring 135 positioned in a suitable groove formed in the scan bar stud.

Figure 11:
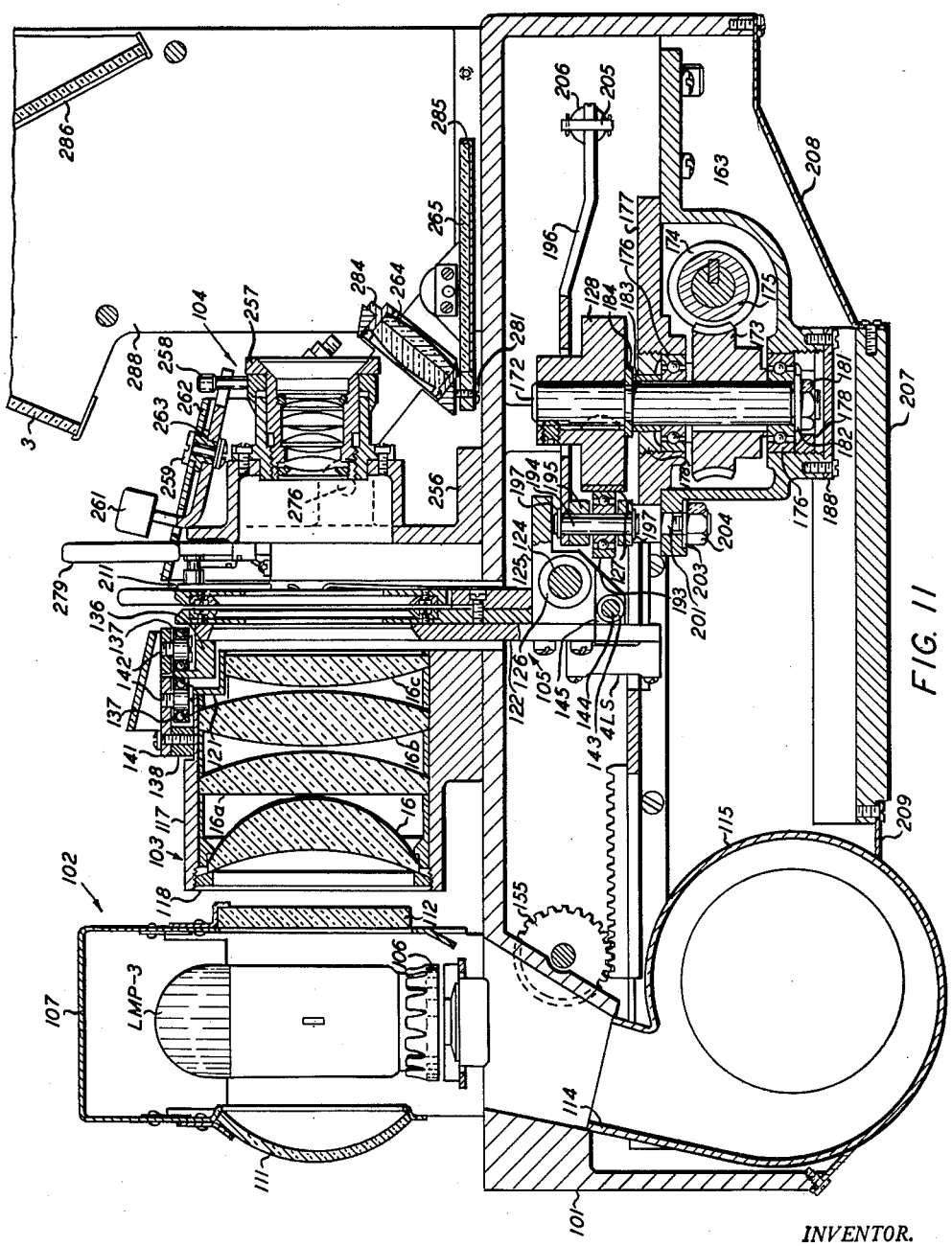
FIG. 11 is a sectional view of the projector taken along line 11—11 of FIG. 9.

The upper end of the carriage plate is guided in a path perpendicular to the axis of the condenser lenses by means of a carriage guide 136 secured to the backside of the carriage plate riding between bearings 137. To support the bearings there is provided a top plate 138 secured to the condenser lens housing 117, the top plate having a bearing plate 141 secured thereon. The front bearing 137, the right-hand bearing as seen in FIG. 11, is held in place by a bearing retaining screw 142 threaded into the top plate 138, and the rear bearing is held in place by a second bearing retaining screw 142 threaded into the bearing plate 141.

To effect return of the carriage to its original starting position there is provided, a return spring 143 encircling a spring support rod 144 secured in the side walls of the projector casing. The return spring is retained at one end by the wall of the projector casing and at its other end the spring contacts spring plate 145 secured to the carriage plate, suitable apertures being formed in the spring plate for the passage of spring support rod 144 and carriage shaft 124.

As is commonly known, engineering drawings are usually made on standard size sheets, designated, for example, as A, B, or C size drawings corresponding to 8½" x 11", 11" x 17", and 17" x 22" size sheets, respectively, by the American Standards Association as referred to their publication ASA Z14.1—1935 (Appendix XXXVL). Although these are the standards for drawings normally used, drawings are also made on common size sheets of paper normally in use, such as for example, 9" x 12", 12" x 18", and 18" x 24" size sheets. When engineering drawings are microfilmed they are usually photographed at a fixed reduction and centered on the film frame so that when copies are made from the microfilm they can be enlarged at a scale so that the reproduction of the drawings correspond to the size of the original drawing.

In the embodiment of the xerographic apparatus disclosed, the apparatus is designed to make A, B and C sized xerographic reproductions from microfilm of original A, B, and C sized drawings. In view of the disclosure contained herein, it will be apparent to those skilled in the reproducing art, that the subject apparatus can be readily modified to scan various size copy on film for the purpose of making other size reproductions on sheets of support material corresponding in size to the size of the original copy.

If the reproduction is to be made, for example, of an A size drawing, the sheet of transfer material inserted into the machine on which the xerographic powder image is to be transferred is of the same size as the original drawing, that is, an 8½" x 11" sheet of transfer material for a standard A size drawing.

To permit scanning of the leading edge of a copy to be reproduced to coincide with the travel of the sheet of transfer material onto which the xerographic powder image of the copy is to be transferred, means are provided to regulate the length of carriage travel whereby only that portion of the microfilm that has copy thereon is scanned. In other words, the start-of-scan position and the end-of-scan position of the carriage can be varied to accommodate various sized images on each microfilm frame.

Figure 12:
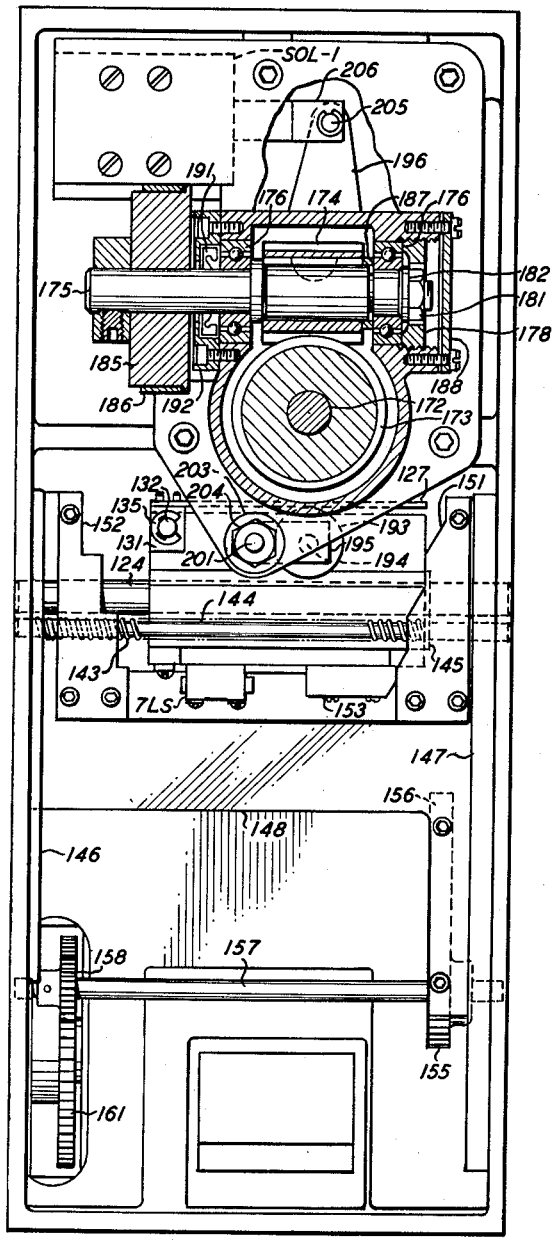
FIG. 12 is a sectional view of the projector taken along line 12—12 of FIG. 10.
Figure 24:
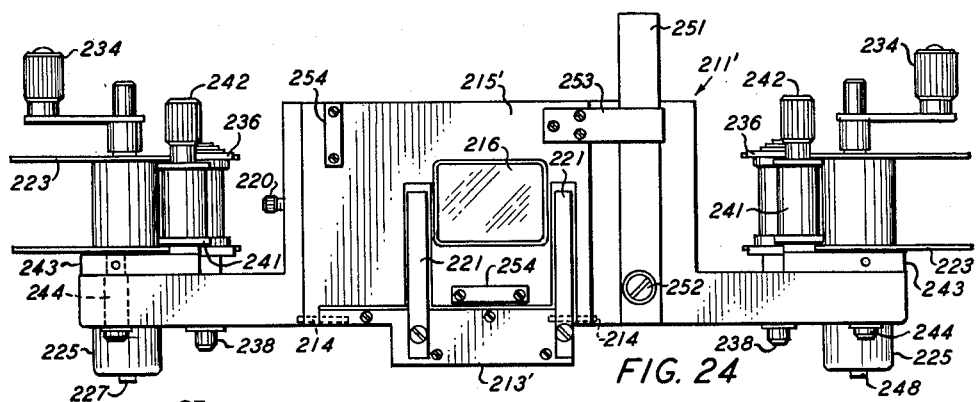
FIG. 24 is a front view of the roll film copy holder.
Figures 26, 27, 28:
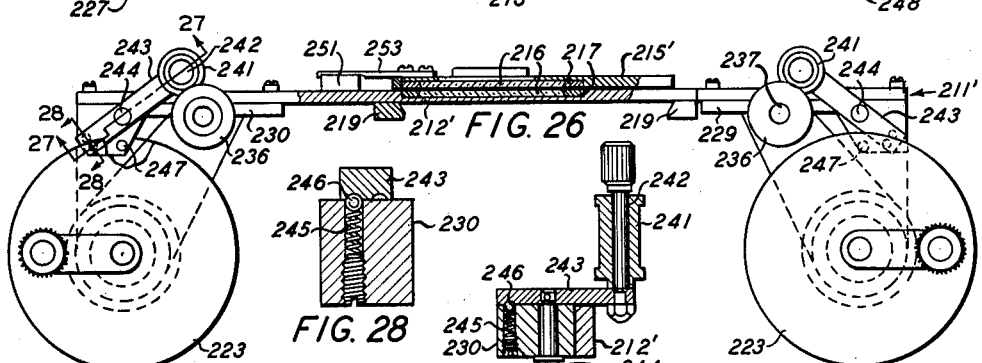
FIG. 26 is a top view, partly in section, of the roll film copy holder.
FIG. 27 is a view taken along line 27—27 of FIG. 26.
FIG. 28 is a sectional view taken along line 28—28 of FIG. 26.
Figure 25:
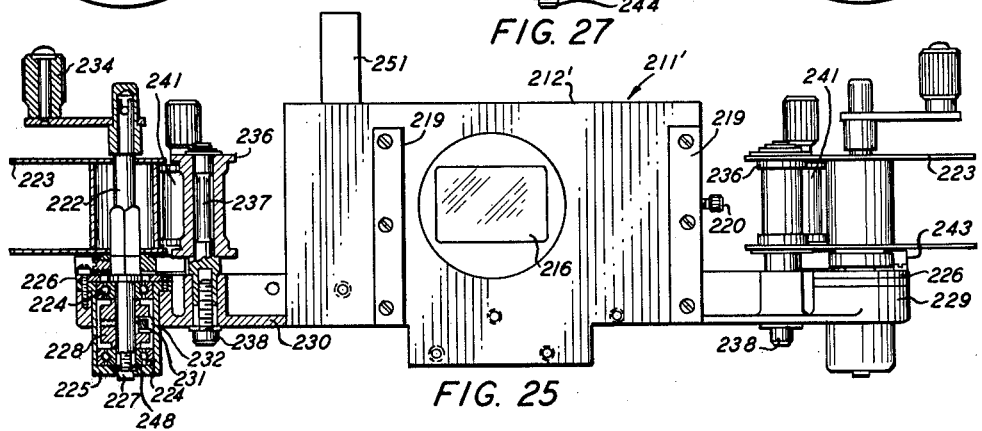
FIG. 25 is a rear view of the roll film copy holder.

To regulate the length of travel of the carriage with respect to the size drawing to be reproduced from microfilm, there is slidably positioned on slide guides 146 and 147 secured to the side walls of the main projector casing, a cam plate 148 having mounted on its left-hand side (right-hand side as seen in FIG. 12), a carriage return stop cam 151 and a scan limit plate 152 on its right-hand side (left-hand as seen in FIG. 12), which are used to define the start-of-scan position and an end of scan position, respectively, of the carriage. The length of travel of the carriage is thus controlled by varying the starting and stop position by means of the stepped return stop cam 151 and scan limit plate 152. The carriage is moved with respect to these elements by means of a cam follower 153 secured to the carriage plate in position to ride against the cam 151.

The length of scan of the carriage is regulated by manually manipulated selector lever 154 used to rotate a pinion 155 which engages a rack 156 secured to the cam plate 148. Pinion 155 is secured to one end of shaft 157 suitably journaled in the projector casing, the other end of the shaft carrying gear 158 which meshes with gear 161 secured to the shaft 162 on which the selector lever 154 is secured. The shaft 162 is suitably journaled in a selector gear housing 163 mounted in alignment with a suitable opening for the gear in the top of the projector casing.

The selector gear housing supports a bracket 164 having a scale 165 thereon indicating the proper position of the selector lever for scanning a particular size drawing on the microfilm. In the embodiment disclosed, the projector is adapted to scan microfilm of A, B, or C size drawings, and therefore the scale is marked with the letters A, B, and C. The second letter A, positioned on its side with respect to the remaining letters, is used to indicate the position of the lever to adjust the carriage for scanning an A size drawing turned on its side on the microfilm. The selector lever is maintained in any preselected position by means of a ball 166 engaging suitably positioned depressions in detent block 167 secured to the selector gear housing, the ball 166 being biased towards the detent block by spring 168 retained in the selector lever by set screw 169. Travel of the selector lever is limited by means of lever stops 171 positioned at opposite ends of the detent block.

Roller 128 which drives the carriage to permit scanning of the copy by frictional contact with the scan bar 127 on the carriage is secured to shaft 172 which carries worm gear 173 meshing with worm 174 carried by drive shaft 175.

Shaft 172 is journaled by bearings 176 positioned in the gear housing 163 and its cover 177, the bearings being retained by threaded lock rings 178. Axial alignment of shaft 172 is maintained by nut 181 disposed against bearing retaining washer 182 at the threaded end of the shaft, and by bearing spacer 183 and retaining ring 184 mounted in a suitable groove at the opposite end portion of the shaft.

Drive shaft 175 journaled by a pair of bearings 176 mounted in the gear housing, carries a pulley and hub assembly 185 driven by a belt 186 as described hereinafter at a predetermined speed relative to the xerographic drum.

As shown, worm 174 butts at one end against a shoulder of shaft 175, and at its other end against a spacer 187 interposed between the worm and a bearing 176 at the threaded end of the shaft, axial alignment of the shaft being maintained by bearing retaining washer 182 forced into contact with the interface of the bearing by nut 181. Removable bearing caps 188 are secured to the gear housing to seal the nut ends of shafts 172 and 175. To eliminate dust from entering the gear housing, the drive end of shaft 175 is sealed by means of a shaft seal 191 enclosed by a seal retainer 192 suitably secured to the gear housing.

To force the scan bar 127 of the carriage into frictional contact with the roller 128 to effect a scan movement of the carriage, there is provided a pressure roller 193, here shown as a bearing, mounted on a bearing pin 194 secured in a bifurcated pressure lever 195 and the solenoid-operated lever 196 by retaining rings 193 positioned in suitable grooves at opposite ends of the bearing pin.

The lever 196 is pivotally secured at one end to the gear housing by a pivot stud 201 passing through the lever 196, pressure lever 195, and the gear housing 163, the pivot stud being retained therein by means of a retaining ring 202 (not shown) at one end of the pivot stud and by means of a washer 203 and a nut 204, the latter being threaded onto the end of the pivot stud.

The lever 196 is connected at its opposite end by a connector pin 205 to the plunger 206 of the solenoid SOL-1 attached to the gear housing, whereby as the solenoid is energized, the lever is pivoted about the axis of the pivot stud thereby rotating the pressure roll against the scan bar 127 to force it into frictional driving contact with the roller 128. As shown, the lever 196 has an aperture formed therein to permit it to be moved relative to the roller 128 over which it is positioned.

As the carriage is advanced by the frictional drive between the scan bar 127 and the roller 128 the limit switch 7LS attached to the carriage contacts the end-of-scan limit plate 152 whereby the limit switch is actuated to break the circuit to the solenoid SOL-1. As the solenoid is de-energized, the contact force applied to the scan bar is released to permit the carriage to be returned by spring 143 to the start-of-scan position.

To protect the elements of the projector mounted within the casing from dust and other foreign objects, the bottom of the projector casing is closed by means of a base plate 207, a front dust cover 208, and a rear dust cover 209.

As previously described, the projector in the embodiment shown, is adapted to scan copy either in the form of microfilm frames mounted in apertures of data processing cards or in the form of roll microfilm.

To carry either type of copy, separate copy holders are provided which are interchangeably carried by the carriage plate, that is, a card copy holder 211 for use with data processing cards, and a film copy holder 211' to carry roll microfilm to be reproduced are provided.

Referring now in particular to FIGS. 20 to 23, inclusive, the card copy holder 211 consists of a back plate 212 having a hinge plate 213 secured to its bottom front face. The hinge plate carries a pair of pins 214 pivotally supporting a front gate 215. Both the back gate 212 and the front gate 215 are counterbored to form a light path, and each of these plates is provided with an optical flat or transparent plate 216 held in place by a retainer plate 217.

The pins 214 permit the front gate to be moved by an operator relative to the back gate for the insertion of a data processing card therebetween, the angle plate or card stop 218 and the hinge plate 213 serving as a guide for the side and bottom of the card, respectively, to center the aperture in the card and therefore the film with respect to the optical flats 216.

Springs 221 secured at one end to the hinge plate 213 normally bias the front gate 215 toward the back gate to firmly grip a card therebetween.

Referring now in particular to FIGS. 20 to 23, inclusive, the card copy holder 211 consists of a back plate 212 having a hinge plate 213 secured to its bottom front face.

The hinge plate carries a pair of pins 214 pivotally supporting a front gate 215. Both the back gate 212 and the front gate 215 are counterbored to form a light path, and each of these plates is provided with an optical flat or transparent plate 216 held in place by a retainer plate 217.

The pins 214 permit the front gate to be moved by an operator relative to the back gate for the insertion of a data processing card therebetween, the angle plate or card stop 218 and the hinge plate 213 serving as a guide for the side and bottom of the card, respectively, to center the aperture in the card and therefore the film with respect to the optical flats 216.

Springs 221 secured at one end to the hinge plate 213 normally bias the front gate 215 toward the back gate to firmly grip a card therebetween.

Referring now in particular to FIGS. 24 to 28, inclusive, the film copy holder 211' also includes a back gate 212' having a hinge plate 213' secured thereto, the latter carrying a pair of pins 214 pivotally supporting a front gate 215'. Both the back plate 212' and the front gate 215' are also counterbored to form a light path and are provided with optical flats or transparent plates 216 held in place by retainer plates 217.

Roll film to be reproduced is carried by a pair of film reels 223, one of which serves as a supply reel and the other serves as a take-up reel. Since the film handling mechanism associated with the supply reel is similar to the film handling mechanism associated with the take-up reel, a description of one will serve as a description of the other. A film reel 223 is carried by a spindle 222 which is journaled in a pair of bearings 224 mounted in bearing housing 225 covered by a housing cap 226. The spindle is retained against axial movement in the bearing housing by means of the shoulder on the spindle riding against the inner race of the top bearing and by a cap screw 227 inserted through a suitable aperture in the bearing housing and threaded into the end of the spindle and supporting a washer 248 riding against the inner race of the bottom bearing.

Spindle 222 has a sleeve 228 secured thereto which is provided with a spring 231 pressed friction clutch 232 in sliding contact with the inner wall of bearing housing to prevent rotation of the spindle except when actuated by an operator. The spindle is manually operated by means of a crank 234 engaging the slotted end of a spindle 222.

Right-hand reel bracket 229 and left-hand reel bracket 230 attached to the right and left-hand ends of the back gate 212', respectively, each carries a bearing housing 225 a film reel and associated elements.

Film is guided in a path parallel to the optical flats by film idler rollers 236 each carried by an idler shaft 237 secured as by cap screws 238 to the reel brackets, and by guide rollers 241 carried by spindles 242. Each spindle is secured to one end of a pivot plate 243 pivotally mounted on a reel bracket by a pivot shaft 244 whereby the guide roller may be moved into a first position in which it is in contact with a film idler roller or into a second position in which the guide roller is moved away from the film idler roller to permit the threading of film therebetween. Each pivot plate is provided with a pair of detents formed in the end thereof and positioned to be engaged by a detent ball 246, inserted in the reel brackets and biased upward by means of springs 245. The angular displacement of the pivot plate in one direction is controlled by a pin 247, mounted in the reel bracket and of course in the other direction by contact of the guide roller with a film idler roller.

A lever 251 pivotally secured by a shoulder screw 252 to the front face of the back gate 212' is adapted to be moved from a first position in which it is out of contact with the cam portion of control arm 253 secured to the front gate 215, to a second position in which it is in contact with the control arm to force the front gate away from the back gate against the biasing action of the springs 221, whereby the film may be moved relative to these gates but out of contact therewith.

Both the back gate 212 of the card copy holder 211' have attached thereto in opposed relation to each other a pair of dovetail guides 219 by means of which the respective copy holder is attached to the carriage plate 122, screws 220 being provided in each of the right-hand dovetail guides to permit the copy holder to be forced against the right-hand dovetail on the carriage plate.

The gate 215 of the card copy holder and the gate 215' of the film copy holder are also each provided with centering guides 254 adapted to be engaged by a manually actuated carrier lever 255 to permit centering of the optical flats of either copy holder with respect to the axis of the projector lens assembly 104 as described hereinafter.

Figure 9:
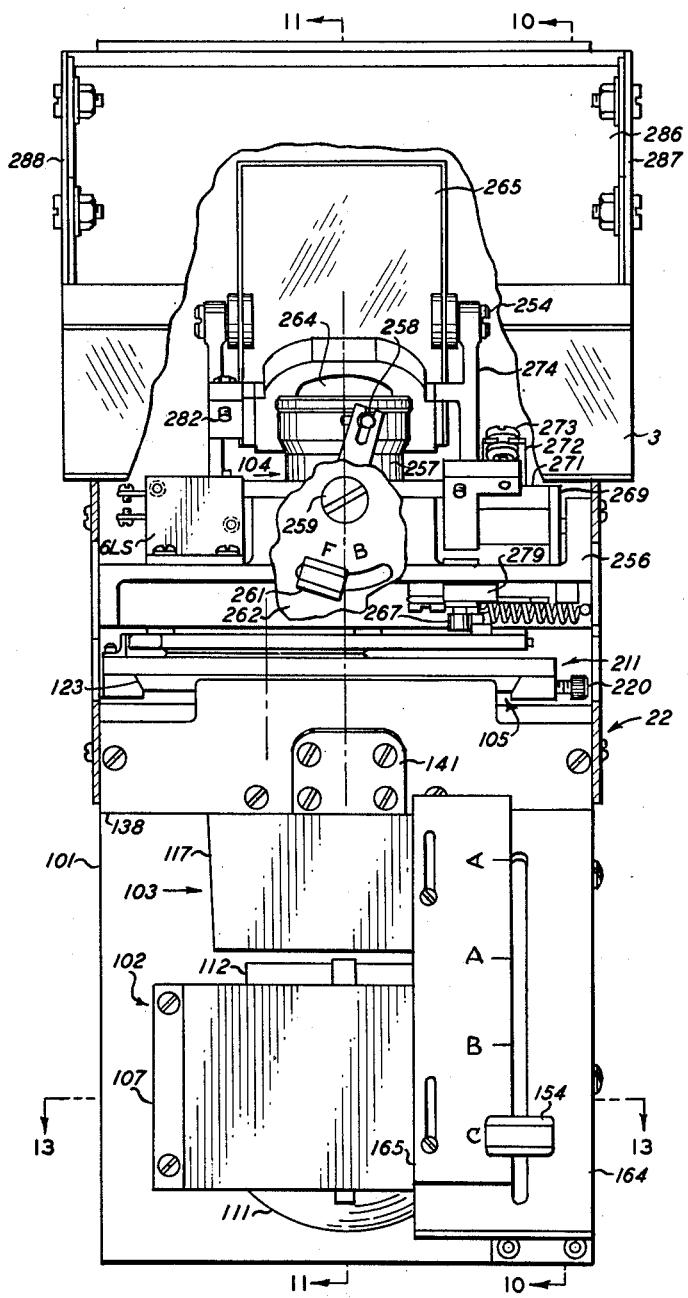
FIG. 9 is a top view of the copy projector.

The projector lens assembly 104 which is connected to the top of the projector casing 101 includes an apertured lens mount 256 for supporting a conventional projection lens unit 257 in alignment with the axis of the condenser lenses. The projector lens unit has a focusing arm 258 actuated by a lever 261 carried by lens cover 262. The lever 261 which is L-shaped and has a bifurcated end which engages the focusing lever, is pivoted about a bushing 263 to which it is connected by fastener 259 to lens cover 262. The other end of the lever 261 extends through an aperture in the lens cover in position to be actuated by an operator whereby the focus of the lens can be adjusted to compensate for film having its emulsion side either toward the front of the film gate or toward the back of the film gate. As shown in FIG. 9 the lens cover has indicating marks F and B thereon to show the proper positoin of the focusing lever to correspond to the position of the film; that is, emulsion side toward the front of the film gate, or emulsion side toward the back of the film gate, respectively.

To permit an operator to view microfilm images, in either roll or aperture card form prior to making a reproduction thereof, means are provided to project an optical image of the desired copy onto the viewing platen or screen 3.

In the case of roll microfilm, the film to be viewed is threaded from the supply reel between the sets of idler rollers and guide rollers and between the gates of the film copy holder to the take-up reel. The film copy holder is then attached to the carriage plate with the dovetail guides thereon engaging the dovetails formed on the carriage plate to align these two elements with each other.

The carrier lever 255, which is normally in the upright position, as shown in FIGS. 9, 14, and 15 in particular, when making reproductions from the microfilm, is manually shifted to the right as shown in FIGS. 16, 17 and 18, when it is desired to view an image of copy on the screen. Movement of the carrier lever 255 by the operator to the right shifts the carriage plate and the film copy holder mounted thereon to a position in which the center of the optical flats on the copy holder is positioned in alignment with the optical axis of the projector lens assembly, and at the same time the actuation of the carrier lever causes a viewer lens 264 and a viewer object mirror 265 to be shifted into the optical path from the projector lens assembly whereby an image from the microfilms is reflected onto the viewing screen 3.

The carrier lever 255 is attached to the back of the lens mount 256 by a shoulder screw 252 which acts as a pivot for the carrier lever. An upper centering stud 267 is attached to the carrier lever in position to engage the upper centering guides 254 on the film copy holder as the carrier lever is pivoted to the right, thereby shifting the copy holder to the right to center the optical flats thereon in alignment with the optical axis of the projector.

FIGS. 14 and 15 illustrate the carrier lever in its normal inoperative position as biased by spring 266 connected at one end to the carrier lever by a second centering stud 267 and at its opposite end by pin 268 to the lens mount, the second centering stud 267 being positioned to engage the centering guides 254 mounted on the bottom portions of the copy holders.

As the carrier lever is moved by the operator to the right, as shown in FIG. 15, to position the film copy holder for stationary exposure of an image onto the viewing screen, the latch 277 is spring 278 biased into engagement with the upper centering stud 267 to hold the carrier lever to the right whereby the film copy holder and its carriage are held in position against the biasing action of spring 266.

The latch 277 which is pivoted around a shoulder screw 252 can be disengaged from the centering stud when it is desired to permit the film copy holder to return to its normal start-of-scan position by actuation of a latch release plunger 279 mounted on the carrier lever for reciprocating movement thereon. The latch release plunger 279, formed as a hollow sleeve adapted to encircle the end of the carrier lever is attached thereto by cap screw 270 threaded into the carrier lever, the cap screw passing through a suitable elongated slot formed in the plunger and acting as a guide to limit the longitudinal movement of the plunger with respect to the carrier lever. The plunger is normally biased upward by the spring 245 positioned within the plunger and located in suitable notches formed in the plunger and the carrier lever. As the latch release plunger is manually moved downward the bottom extended edge of the plunger strikes the latch 277 to force it out of engagement with the centering stud to release the film copy holder and the carriage plate to return to their normal starting position by the action of the return spring 143.

Figure 10:
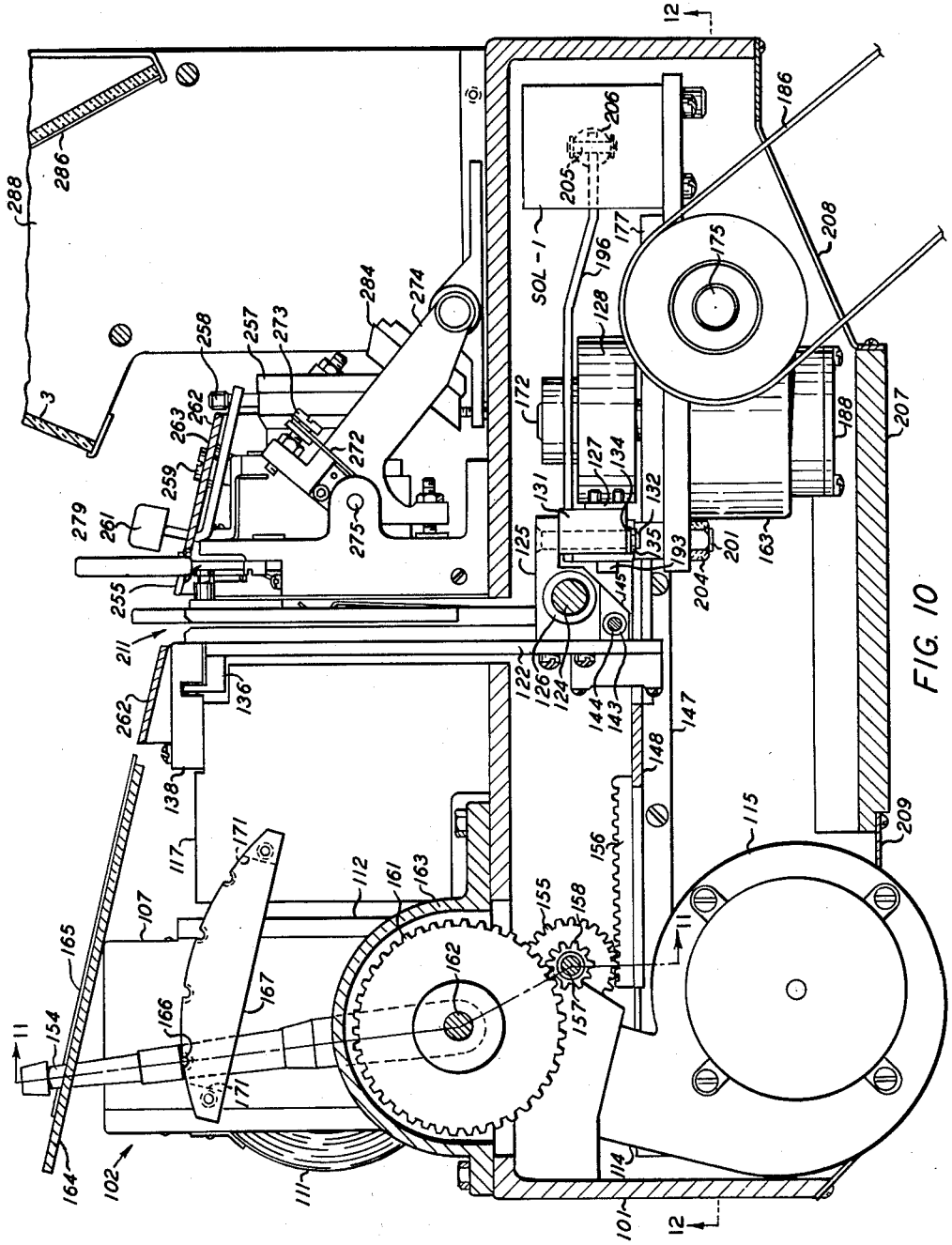
FIG. 10 is a sectional view of the projector taken along line 10—10 of FIG. 9.

As seen in FIGS. 15, 17, and 19 the carrier lever 255 has an arm formed thereon to actuate an elevating lever 269 extending through the lens mount. The elevating lever is connected to a support block 271 having attached thereon an elevating spring 272 having its bifurcated end in engagement with a grooved actuator screw 273 adjustably secured to bracket 274 carrying the viewing lens 264 and the small object mirror 265. The support block and the right-hand side of the bracket are journaled on a long shaft 275 secured to the right-hand side of the lens mount bracket, and the lefthand side of the bracket 274 is journaled on short shaft 276 attached to the lefthand side of the lens mount bracket. With the carrier lever in its normal inoperative position as shown in FIGS. 10, 11, and 15, the weight of the lens mount bracket and the elements attached thereto will cause it to rotate to its inoperative position, as shown in these figures, wherein the viewing lens and the object mirror 265 are out of the optical path of the projection lens assembly. Actuation of the carrier lever to the right, as shown in this position in FIGS. 16, 17 and 18, will cause the elevator lever to be depressed, to rotate the support block and the elevating spring, attached thereto, to draw the bracket 274 upward to position the viewing lens and the object mirror in alignment with the optical axis of the projector lens assembly.

The actuator screw 273, adjustably secured at the top of the bracket to contact a positioning button 283 on the upper portion of the lens mount bracket, is used to regulate the operative position of the bracket whereby the viewing lens is positioned parallel to the plane of the projection lenses, and a position screw 282 secured at the bottom of the bracket to contact a second positioning button 283 is used to regulate the downward travel of the bracket. A second position screw 282 is threaded in the bracket 274 in position to actuate a limit switch 6LS connected to an electrical circuit described hereinafter, is used to energize the projector lamp for viewing a film on the viewing screen.

The viewing lens 264 carried in a suitable lens carrier 284 attached to the apertured crossbar of the bracket 274 is used to focus an image from a copy onto the viewer object mirror 265 to be reflected onto a viewer image mirror 286 and from there onto the viewing screen 3 as seen in FIGS. 10 and 11. The viewer object mirror 265 is mounted in a suitable mirror frame 285 pivotally mounted about its axis on the bracket 274 by means of screws 254, and adjustably secured at one end by screws 281 to the apertured crossbar of the bracket.

Both the viewing platen or screen 3 and the image mirror 286 are mounted on screen supports 287 and 288 attached to the sides of the projector casing 101.

With the optical flats of film copy holder centered with respect to the optical axis of the projector, the operator can move the film by manipulation of the cranks until the frame containing the desired image to be reproduced is projected onto the screen and centered thereon whereby this particular frame of film is in proper registration with the optical flats so that when the carriage carrying the copy holder is returned to its start-of-scan position, the frame carrying the image to be reproduced is in proper position to be scanned.

Although it is not necessary to use the above described apparatus to center the microfilm frame carried by an aperture card with respect to the optical flats of the card copy holder, since this is done automatically when the card is inserted against the card stop of this copy holder, it is realized that if the operator so desires he can project an image of the copy carried by the aperture card onto the viewing screen in the same manner as described above in relation to the projection of roll film.

In order to limit the external dimensions of the disclosed xerographic apparatus, a folded optical system including an object mirror 27 and an image mirror 28 is used to project a radiation image from a copy onto the xerographic drum. To protect the xerographic drum from extraneous light at the exposure station a light shield 24 is connected by means of brackets 291 and 292 to the frame plates 6 and 7, respectively, with the slotted aperture 26 in the light shield positioned directly above and in closely spaced relationship to the peripheral surface of the drum as seen in FIG. 5. Light projected from the projection lens assembly through the opening in the light shield is reflected by the object mirror 27 onto the image mirror 28 which in turn reflects the image through the slot 26 in the light shield onto the drum 20.

*Sheet Feed Mechanism*

A sheet of support material, such as paper, inserted in the machine by an operator through a receiving slot in the front thereof formed by paper guides 13 and 14 is forwarded by an endless conveyor to the xerographic drum adjacent the corona transfer device, whereat a xerographic powder image previously formed on the drum is transferred from the drum to the sheet of support material, the sheet then being forwarded by the conveyor to the heat fuser 45 and then to a set of delivery rolls which deliver the sheet of support material to the collecting tray 4.

Figure 3:
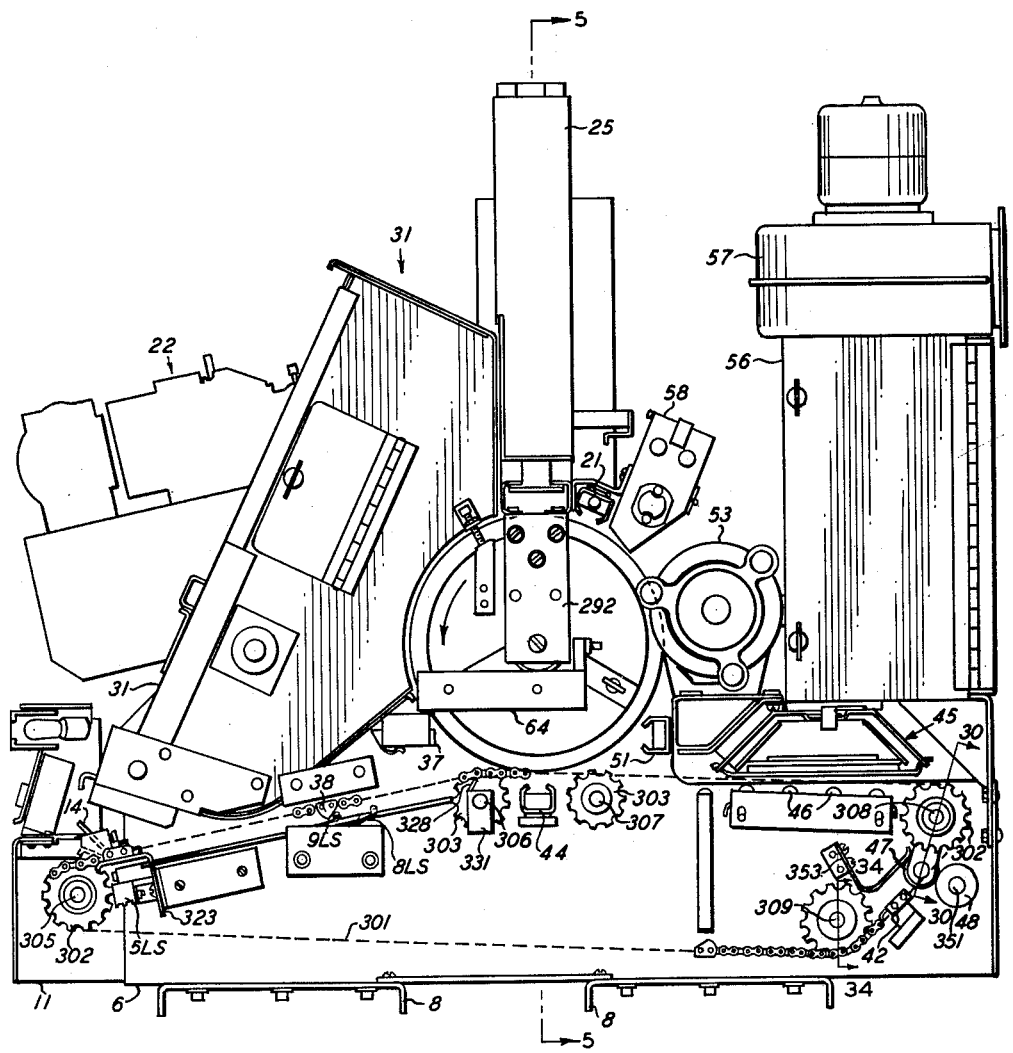
FIG. 3 is a right-hand view of the xerographic apparatus of the invention with the right-hand frame plate removed.
Figure 29:
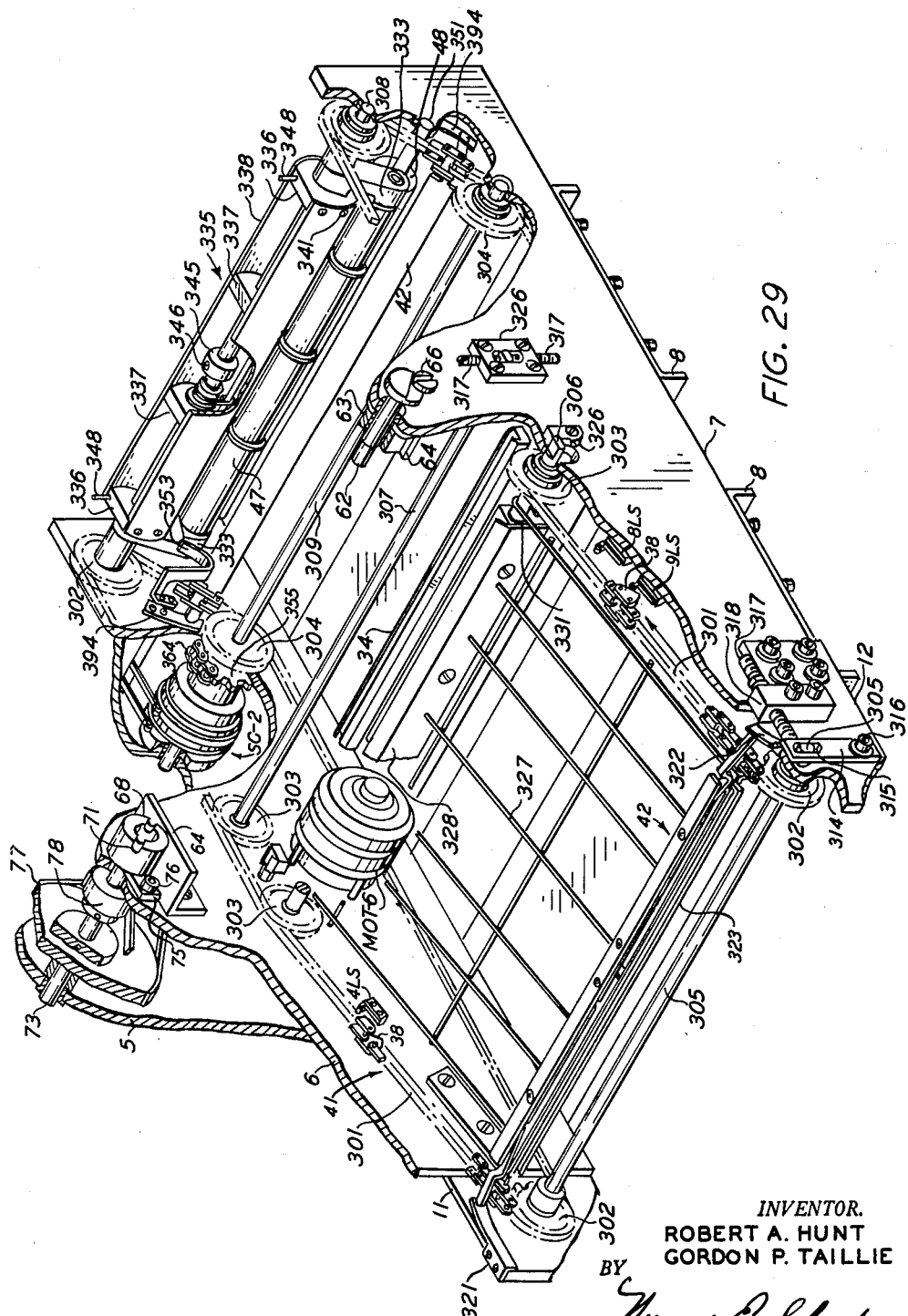
FIG. 29 is a right-hand perspective view of the paper conveyor mechanism of the apparatus with parts broken away to show the arrangement of the various elements.

Referring in particular to FIGS. 3, 4 and 29, the conveyor 41 includes two endless roller chains 301 which pass from sprockets 302 carried by front axle 305 over sprockets 303, on axles 306 and 307, which guide the chains in a path tangential to the surface of the drum, then over and around a second set of sprockets 302 on axle 308 down to drive sprockets 304 secured to drive shaft 309 and then back to the sprockets on axle 305. All of these sprockets are positioned on their respective shaft or axles to space the chains apart from each other by a distance greater than the length of the drum.

In the embodiment of the conveyor apparatus disclosed, the chains carry two paper grippers 42 equally spaced from each other along the length of the chain, the paper grippers being positioned on the chain at right angles to the path of travel of the chain for movement therewith and in a circuit between sheet-receiving and sheet-delivering stations. Means are provided to cause the paper grippers to take hold of the front edge of a sheet of transfer material at the receiving station and to hold this sheet while traveling to the delivery station and there to release the sheet for discharge from the machine.

Two paper grippers are used in the preferred embodiment of the machine so that as one paper gripper moves from the receiving station carrying a sheet of transfer material to the delivery station, the other paper gripper will move from the delivery station to the receiving station to be in position to receive a second sheet of transfer material.

Axle 305, which carries a pair of sprockets 302 journaled thereon by means of flanged bearings 312 and positioned axially by suitable thrust washers 313 and collars 311, is movably mounted by means of axle supports 314 pivotally secured by shoulder screws 316 to the extension plates 11 and 12, the axle having flattened recessed ends that are slidably received in slots 315 in the axle supports. Suitable elongated slots are formed in the extension plates to permit longitudinal movement of the axle whereby the tension of the roller chains is adjusted by manipulation of the adjusting screws 317 threaded through the blocks 318 secured to the extension plates.

Gripper actuators 321 and 322 are positioned on the extension plates 11 and 12, respectively, for effecting operation of the paper grippers 42 to receive a sheet of transfer material at the receiving station of the conveyor. A gripper bar support plate 323 is also secured to the extension plates at the sheet-receiving station to limit downward deflection of a paper gripper as a sheet of transfer material is inserted therein, the gripper bar support plate carrying a limit switch 5LS used to control the operation of the conveyor as described hereinafter.

Sprockets 303 are journaled by means of flanged bearings 312 on axles 306 and 307, axial alignment of the sprocket being maintained by means of thrust washers 313, collars 311 and by retaining rings 325, the latter being positioned in suitable grooves formed in the axles. The axles extend through slots in plates 6 and 7 into suitable openings in axle support blocks 326 attached to the frame plates whereby the axles are positioned and retained by means of screws 317 so that the pitch diameter of the sprockets 303 carried by these axles are positioned in a plane tangential to the xerographic drum.

To guide the trailing edge of a sheet of transfer material carried by a paper gripper, a wire grid 327 is positioned between axle 305 and axle 306, the wire grid being attached at one end to the gripper support plate 323 and at its other end to axle 306.

As a sheet of transfer material is forwarded from the receiving station to the delivery station the portion of the sheet not firmly held by a paper gripper is arched upward into contact with the drum by a guide 328 attached to the guide support bar 331 loosely mounted on axle 306. The guide 328 is formed as a thin flexible member to permit the upper portion of the guide to be deflected by a paper gripper as it passes thereover. The guide support bar is constructed with a bore located above its center so that it will have a pendulous action as loosely mounted on the axle 306.

As the sheet of transfer material is arched toward the drum it is electrostatically tacked onto the drum whereby the transfer material moves synchronously with the drum while in contact therewith.

Axle 308, fastened at its ends in the plates 6 and 7 by screws 316, rotatably carries the second set of sprockets 302 thereon, the sprockets being supported on the axle inboard of the frame plates by flanged bearings 312. The axle 308 carries a pair of idler roll supports 333 for the idler delivery roller 47 journaled thereon by bearings 332. The idler roll supports are spaced apart from the sprockets by collars 334, and a paper guide roll, generally designated 335, of the type disclosed in copending application, Serial No. 46,464, filed concurrently herewith on August 1, 1960, in the name of Rutkus et al. The paper guide roll 335 is used in preferred embodiment of the sheet conveyor shown to permit the use of a conveyor having a shorter length of travel to be used in the preferred embodiment of the machine. As previously described the transfer of the xerographic powder image from the xerographic drum to a sheet of transfer material is accomplished by means of an electrostatic field created by a corona discharge device.

In operation, the electrostatic field created by the corona discharge device is effective to tack the transfer material electrostatically to the drum surface, whereby the transfer material moves synchronously with the drum while in contact therewith. As the paper gripper carrying the sheet of transfer material away from the surface of the drum against the electrostatic forces tending to tack the paper to the drum. On a continuous straight line path of the paper gripper, the sheet of transfer material would be uniformly pulled away from the surface of the drum in a line substantially parallel to the path of travel of the paper gripper. This, of course, would require the use of a conveyor having a straight line run from the drum of a length at least equal to the length of the largest sheet of transfer material to be transported by the conveyor.

To reduce the overall size of the xerographic apparatus, a conveyor is used in the machine which has a straight run from the drum of a length less than the length of the largest sheet to be transported by the conveyor. However, with a conveyor of this size, as seen in FIG. 3, it is apparent that one end or the trailing edge of a relatively long sheet of transfer material could still be in contact with the drum while its leading edge, as carried by the paper gripper, could be traveling around the axle 308. It can be readily seen that, without a paper guide roll mounted on the axle 308, as the paper gripper passes around the axle the length of travel of a sheet of transfer material would be shortened, thereby permitting the trailing edge of the sheet of transfer material to be carried up and around the drum by the tacking action of the transfer material to the drum to a point where the top surface of a sheet of transfer material would contact other elements of the xerographic machine positioned above the conveyor belt. If this is permitted to occur the xerographic powder images, carried by the upper surface of the transfer material by electrostatic attraction only, prior to fusing, would be smeared or completely brushed off as the transfer material contacted these elements.

To overcome this problem to permit use of a smaller conveyor assembly, a paper guide roll 335 is used to guide the trailing portion of a sheet of transfer material around the axle at a speed equal to the lineal speed of the paper grippers. Since the lineal speed of travel of the paper gripper is equal to the peripheral speed of the xerographic drum, the sheet of transfer material is pulled from the drum at a constant rate whereby it is prevented from being carried around by the drum into contact with other elements positioned adjacent to the drum.

In the embodiment shown, see especially FIGS. 29, 30 and 31, the paper guide roll 335 consists of a pair of end spacers 336 and a pair of spacers 337 formed as segments of a circle. A guide plate 338 is secured as by screws 341 to the peripheral surface of these spacers 336 and 337 whereby the guide plate forms an elongated single guide for a sheet of transfer material, the radius of the peripheral surface of the guide being equal to the pitch radius of the sprockets 302 for the purpose to be described hereinafter. The end spacers are provided with bearings 342 so that this assembly of guide plate and spacers is free to rotate with respect to axle 308. The rise of the chord of the spacers is such that the chord surface of each spacer is positioned below the path of travel of the paper gripper bar carried by the chains, or stated in a different manner, the rise of the spacers is slightly greater than the distance from the center line of the chain to the bottom of the paper grippers.

The chord portions of the spacers 336 and 337 are yieldingly biased into a position parallel to the straight line path of travel of the roller chains as it approaches axle 308 by means of a torsion spring 344. The torsion spring which encircles axle 308 is attached at one end to a spring clamp 345 adjustably secured to the axle by screw 346 and at its other end the torsion spring is attached to a counterbalance rod 347 projecting through arcuate slots provided in the spacers and secured in an adjustable position by nuts 348. A thrust washer 313 encircles the axle between the torsion spring 344 and the left-hand spacer 337 as seen in FIG. 30 to prevent axial expansion of the torsion spring.

Each end spacer 336 is provided with a pin 348 positioned on the chord of the spacer in interference relation with the paper grippers in their path of travel, so that, as a paper gripper travels over the chords of the spacers it will contact the pins, as seen in FIG. 32, to rotate the paper guide roll as the paper gripper travels around axle until the paper gripper slides off the pins as it continues in its path as defined by the travel of the roller chains. Rotation of the paper guide roll around axis of axle 308 brings the peripheral surface of the paper guide roll into position, as shown schematically in FIG. 33, to guide the sheet carried by the paper gripper in a path corresponding to the path of travel of the paper gripper around axle 308.

While the sheet is being pulled at one end by a paper gripper or by the delivery rolls described hereinafter, and held back at its other end by its tacking force onto the drum, the paper guide roll with remain rotated in the position shown in FIG. 33 by the frictional contact of the sheet as it moves thereover, it being understood that the biasing action of the torsion spring should be such that it will rotate the paper guide roll to its normal positions, as shown in FIG. 32, while still permitting the paper guide roll to be rotated against the biasing action of this spring by a paper gripper and to be held rotated in this position by the frictional contact of sheet as it is pulled tight around the paper guide roll.

As the trailing edge of a sheet is pulled off the drum, the sheet is no longer pulled tight over the peripheral surface of the paper guide roll permitting it to be returned to its normal position by the biasing action of torsion spring 344.

When the paper gripper leaves the paper guide roll 335 it travels between the delivery rollers 47 and 48 to a position intermediate the delivery rollers and the drive shaft 309 where the paper gripper is actuated by cams 394 to release the sheet for discharge to the collecting plate by these delivery rollers.

Delivery roller 48, which is a driven roller, is secured to shaft 351 suitably journaled in frame plates 6 and 7 and is driven by sprocket 352 secured to the end of the shaft 351 between frame plates 5 and 6.

Delivery roller 47, which is an idler roller, is journaled at its ends in idler roll supports 333 rotatably supported on axle 308, the delivery roller 47 being yieldingly biased against the delivery roller 48 by means of springs 353 mounted on frame plates 6 and 7 so that the delivery roller 47 is driven by frictional engagement of rubber O-rings 354 mounted thereon with delivery roller 48 or with a sheet of material interposed between said rollers. The springs 353 permit the delivery roller 47 to be forced away from delivery roller 48 as it is contacted by a paper gripper 42 to permit the paper gripper to pass between this set of rollers.

The roller chains carrying the paper grippers are driven by the drive sprockets 304 secured to drive shaft 309 rotatably journaled in frame plates 5, 6 and 7 as shown in FIGS. 29 and 34. Drive shaft 309 is maintained axially in position at one end by a collar 311 and thrust washer 313, and at its other end by thrust washer 313 and retaining ring 325, the latter being inserted in a suitable groove formed in the drive shaft. Drive shaft 309 is driven by sprocket 355 through a conventional magnetic clutch SC–2, for example, a model C–60 clutch manufactured by Simplatrol Products Corp., Worcester, Massachusetts. The magnetic clutch includes two clutch plates 357 and 358 which are shown schematically in the electrical circuit of FIG. 42 as clutch SC–2.

Clutch plate 357 is secured to the drive shaft 309 for rotation therewith by key 361 and screws 316 threaded in the hub of clutch plate 357, while clutch plate 358 is journaled by suitable bearings on the drive shaft and carries a clutch adapter 363 supporting sprocket 355 driven by chain 364 from a suitable drive mechanism described hereinafter. Thus, clutch plate 358 is free to rotate about the axis of the drive shaft while clutch plate 357 remains stationary due to the friction of the elements attached thereto.

The magnetic clutch is connected to a suitable source of power, as described hereinafter, through brushes 365 bearing on suitable collector rings on clutch plate 358, the brushes being secured to and insulated from the frame plate 6 by bracket 367.

Although any suitable paper gripper may be used to grip the sheets of transfer material to permit them to be transferred through the xerographic apparatus, the paper grippers 42 are used of the type disclosed in copending application, Serial No. 46,462, filed concurrently herewith on August 1, 1960, in the name of Hunt. The two paper grippers are of like construction and for simplicity the following description relates only to one set.

As shown in detail in FIGS. 35 to 43, inclusive, the paper gripper 42 consists of a gripper bar housing in which a right-hand gripper bar 374 and a left-hand gripper bar 375 are positioned within the housing to coact with a portion of the housing to grip a sheet of transfer material.

The gripper bar housing includes a bottom panel 376 and a top panel 377 held together in spaced parallel relation to each other as by screws 378 threaded into center spacer 381 and end spacers 382 secured as by welding to the bottom panel and top panel, respectively.

The bottom panel which is of a length to extend transversely between the two roller chains has up-turned end extensions 383 with suitable apertures formed therein to coincide with the pitch of the chains whereby the bottom panel is adapted to be attached to the chains 301 by means of elongated chain pins 384 of the roller chains. The bottom panel which is substantially U-shaped has a longitudinal rear lip 385 (in terms of the direction of chain travel) which is of a length greater than the length of the leading edge of a sheet of transfer material on which xerographic powder images are to be transferred.

The bottom panel has an aperture 389 in the center thereof to receive the actuator lever of a limit switch 5LS when positioned thereover for a purpose described in detail hereinafter.

The right-hand gripper bar 374 and the left-hand gripper bar 375 are actuated by means of a right-hand lever 386 and a left-hand lever 387, respectively, each being pivotally secured in the gripper bar housing by a lever pivot pin 388 positioned in suitable apertures in the bottom panel 377 and secured thereto as by silver soldering. Each of the lever pivot pins 388 has a threaded aperture therein to receive a screw 378 passing through the top panel.

The right-hand lever 386 which is pivotally supported near its center by the lever pivot pin 388 on the right-hand side of the gripper assembly is also pivotally secured near one end to the right-hand gripper bar by a dowel pin 391 held in place by the top and bottom panels. The other end of this lever extends beyond the right-hand end of the gripper bar housing and is suitably formed to extend above the upturned end of the bottom panel whereby it may be actuated by cam 322 or cam 394 to effect movement of the right-hand gripper bar away from the turned-up lip of the bottom panel.

The left-hand lever 387 which is pivotally supported near its center in a similar manner to the right-hand lever by a lever pivot pin 388, is also pivotally secured near one end to the left-hand gripper bar by a second dowel 391. The other end of the left-hand lever extends beyond the left-hand end of the gripper bar housing to be actuated by cam 321 or cam 394 to effect movement of the left-hand gripper bar away from the turned-up lip of the bottom panel.

The right-hand gripper bar and the left-hand gripper bar cooperate with the lip of the bottom panel to grip a sheet of transfer material inserted therebetween to enable the sheet of transfer material to be transported to the machine, these gripper bars being normally biased toward the lip of the bottom panel by means of a leaf spring 392 having its center portion positioned between the spacer 381 and the front turned-up edge of the bottom panel, one end of the spring contacting the right-hand lever and the opposite end of the spring contacting the left-hand lever to bias the gripper bars against the lip, or against the lip of the bottom panel with a sheet of transfer material interposed therebetween.

The right-hand lever and the left-hand lever of the gripper bar when actuated by the cams are pivoted around the pivot pins 388 to force the gripper bars toward the front of the gripper bar housing against the tension of spring 392, a pair of stops 393 being positioned to limit the forward travel of the gripper bars. To prevent binding of the gripper bars against the pivot pins each of the gripper bars is formed with a suitable notch 395 to permit the gripper bars to slide relative to the gripper pins.

*Drive Mechanism*

In the preferred embodiment of the apparatus disclosed, the drum 20, the scan mechanism of the optical projector 22, and the sheet conveyor 41 including the delivery roller 48 are all driven by a main drive motor MOT–6 through a first and second speed reduction mechanism whereby these elements are driven at predetermined speed relative to each other.

Shaft 85, of the first speed reduction unit, is journaled in frame plates 5 and 6 and operatively connected to motor MOT–6 by belt 86, which runs on pulleys 87 and 88 fixedly mounted on shaft 85 and on the shaft 89 of MOT–6, respectively; the motor shaft 89 extending through a suitable aperture in frame plate 6 to which the motor MOT–6 is adjustably secured.

Shaft 91, of the second speed reduction unit, is also journaled in frame plates 5 and 6 and is operatively connected to shaft 85 by belt 92, which runs on pulley 93 fixedly mounted on shaft 91 and on shaft 85 which has an undercut portion thereon serving as a pulley. Tension on belt 92 is maintained by idler 94 adjustably secured to frame plate 5.

Shaft 91 also has secured thereon pulley 95 which is connected by belt 96 to the drum drive pulley 77 fixedly secured on drum drive shaft 73, belt tension being maintained by idler 97 adjustably secured to frame plate 5. Sprocket 98 also fixedly connected to shaft 91 is used to drive the delivery roller 48 and the sheet conveyor by means of chain 364, the chain traveling from sprocket 98 over to and around sprocket 352 on delivery roller shaft 351, back over sprocket 355 secured to clutch plate 358, down and around idler sprocket 99 adjustably secured to frame plate 6 and back up to sprocket 98.

The optical scan mechanism is driven by means of belt 186 connecting the optical drive pulley 185 to the pulley 78 fixedly mounted on shaft 175 and drum drive shaft 73, respectively, the belt 186 being properly tensioned on these pulleys by idler pulley 94a adjustably secured to frame plate 6.

Fuser

The developing materials used to form the powder images are specifically designed to permit them to be fixed to support material either by heat fixing or vapor fixing techniques, that is, the individual particles of resin (toner) soften and coalesce when heated or plasticized by solvent so that they become sticky and readily adhere to the support material. Thus, although any suitable fusing device may be used, in the embodiment shown, a heat fuser of the type disclosed in copending Eichler application, Serial No. 797,143, filed March 4, 1959, is used to supply heat by means of resistance elements for fusing the powder images. In the embodiment shown the fuser contains three resistance elements designated R1, R2, and R3 for the purpose described hereinafter.

Machine Operation

A clearer understanding of the operation of the machine can best be obtained by reference to the schematic wiring diagram, the sequence of operation chart, and the following description.

Before the xerographic apparatus may be actuated, the doors of the cabinet must be closed to actuate the interlock switches 1LS, 2LS, 3LS and 10LS, mounted on the cabinet frame, not shown. These interlock switches are used so that the machine may be operated only when the doors of the cabinet are closed. This provision is made, not only from the standpoint of safety, but also to ensure proper circulation of air throughout the interior of the machine to dissipate heat generated by the apparatus. A paper gripper 42 must also be in position to receive a sheet of support material. As described hereinafter, the switch actuator 38 on the paper conveyor contacting the end-of-cycle limit switch 4–LS stops the paper conveyor to position a paper gripper in position at the receiving station to receive a sheet of support material.

The entire assembly of the apparatus is energized by momentarily closing main power switch SW–1 connecting the assembly to a suitable source of power, such as a commercial 220-volt alternating current outlet. Switch SW–1 is closed by depressing the button on the control panel 2 marked ON.

Upon closure of switch SW–1, control relay 1CR is energized to close its contacts 1CR–1, 1CR–2 and 1CR–3. With the closure of contact 1CR–3, the switch SW–1 may be released, the circuit then being maintained through the normally closed contact 2TR–A of thermal timer 2TR, and normally closed switch SW–2 to supply power to the control relay 1CR to keep its contacts closed. Switch SW–2 is controlled by the button on the control panel marked OFF. At the same time transformers T–1, T–2, and T–3, clock meter M–2 and the power supply PS–1 are energized, the latter supplying high voltage power to the corona charging device 21, the corona transfer device 44 and the corona precleaning device 51 to energize these units. The clock meter M–2 is mounted on any suitable location on the cabinet frame, not shown, and is used to indicate total elapsed operating time of the machine. Fluorescent lamp LMP–4 is also energized through a conventional starter 8–1 and ballast L–1 circuit.

Switch SW–4, which is a mechanically interlocked three-position push buton switch is used to control the voltage applied to the resistance elements of the heat fuser. Switch SW–4, not shown, except schematically, is mounted in a suitable location on the apparatus accessible by the operator. As shown, the different contacts of switch SW–4 are connected to different secondary taps of the multiple tap transformers T–2 and T–3 to obtain preselected voltages to the resistance elements R–1, R–2 and R–3 of heat fuser 45.

As transformers T–2 and T–3 are energized, power is supplied directly to the resistance element R–1, which is the heating element of the fuser normally used, and through the normally closed contact 3TR–A of thermal timer 3TR to the resistance element R–2. Resistance element R–2 is used as an auxiliary heating element to aid in bringing the heat fuser up to its normal operating temperature rapidly. Thermal timer 3TR, which is also energized upon the closure of switch SW–1 through and then closed contact 1CR–1, is preferably a three-minute timer, that is, three minutes after it is energized while at ambient room temperature it will heat up sufficiently to open its contact 3TR–A thereby de-energizing resistance element R–2.

If the machine is operated for a sufficient period of time to permit the heat fuser to be brought up to its normal operating temperature and then the machine is shut down there will be a considerable time delay before the heat fuser will cool sufficiently to reach ambient room temperature. Now if the machine is again energized and the resistance element R–2 is again energized for a three-minute interval, there would be sufficient heat capacity left in the fuser so that with the additional heat supplied by resistance element R–2 the fuser would become overheated to the extent that a support material such as paper passing therebeneath would be scorched. To prevent this, a thermal timer 3TR is chosen with a characteristic curve such that it too will have an extended period of time in which to cool down sufficiently to close its contact 3TR–A. With a timer of this type it is then possible to re-energize the machine after a brief shutdown interval without overheating the fuser because a three-minute cycle will no longer be necessary to heat up the timer 3TR to open its contact 3TR–A.

The third resistance element R3 can be connected by an operator, if required, in order to fuse powder images on card stock or heavy transfer material for which a higher heat output is necessary. For this purpose there is provided a switch SW–5, suitably positioned on the apparatus for access by the operator.

Simultaneously with the closure of switch SW–1 the following motors are energized: the main drive motor MOT–6 for driving the drum through the various processing stations; a brush cleaner motor MOT–7 suitably connected for rotating the cleaning brush 52; the motor MOT–5 for operating the developer conveyor 34 and the toner dispenser 36; and the motors MOT–1 for blower 49; motors MOT–2 and MOT–3 for fan units 57, motors MOT–4 and MOT–9 for fan units 59; and motor MOT–8 for blower unit 115.

As contact 1CR–1 is closed a 20-second timer 1TR is energized as is the 2-minute shutdown thermal timer 2TR. Timer 2TR if left energized for 2 minutes would heat sufficiently to open its contact 2TR–A to de-energize the machine circuit. Control relay 3CR energized through normally closed contact 2CR–1B of control relay 2CR at this time causes its normally closed contact 3CR–A to be opened thereby preventing the solenoid SOL–2 of the clutch drive to be energized. At this time, limit switch 7LS and contact 5CR–1B of control relay 5CR, which are normally closed, permit the reload lamp LMP–2 to be energized at this time.

Twenty seconds after the closure of switch SW–1, the thermal timer 1TR is heated sufficietly to close its contact 1TR–A thereby permitting the print lamp LMP–1 to be energized, thus indicating to the operator that the machine is in readiness to make a xerographic reproduction.

Upon the insertion of a sheet of support material in a paper gripper 42, the leading edge of the support material will trip the actuator of the limit switch 5LS to thereby energize control relay 2CR. As control relay 2CR is energized its contacts 2CR–1A and 2CR–2 are closed and its normally closed contact 2CR–1B is opened.

As contact 2CR–1A is closed a meter M1 (not shown, except schematically in FIG. 44), used to record the number of reproductions made, is energized, while closure of contact 2CR–2 permits the control relay 4CR to be energized through normally closed limit switch 6LS-B on the optical assembly. With power applied to control relay 4CR its holding contact 4CR-1 is closed, as is its contact 4CR-2 to energize the projector lamp LMP-3 through resistor R5 for projecting a light image onto the drum.

With the closure of contact 2CR-1A contact 2CR-1B is opened thereby de-energizing control relay 3CR closing its contact to permit the clutch SC-2 to be energized through resistor R4 and a conventional selenium rectifier circuit SR-1. Clutch SC-2 when energized connects the paper conveyor through a previously described drive mechanism to motor MOT-6. As the chains on the conveyor are rotated, the paper gripper bar levers slide off their respective actuating cams 321 and 322 to permit the paper to be gripped by the gripper bar, and as it moves away, the paper is conveyed out of contact with the limit switch 5LS, permitting its release. At this time, control relay 2CR remains energized through its own holding circuit previously described. As the chain on the paper conveyor continues to move, the actuator on the chain is withdrawn from the end-of-scan limit switch 4LS to release it, thereby breaking the circuit to the timer 2TR, lamp LMP-1 and meter M-1.

Referring now to switch SW-3, this is a mechanical interlock two-position push button switch used to connect the circuit either to a limit switch 8LS or a limit switch 9LS, depending on which way the switch SW-3 is thrown. The only difference between these two limit switches is that they are positioned to be tripped a fixed distance of time with respect to each other from the start of operation. If the switch 8LS is placed in the system by closure of switch contact SW-3A, the transfer material is forwarded to the drum to place the leading edge of the transfer material about ¾" in advance of the leading edge of the copy image. This is used for duplicating masters or other large sheets where it is desirable to leave ¾" edge so that the master can be bound into a press. Normally, as shown, the limit switch 9LS is used through closure of contact SW-3B because the most common transfer material is paper.

As the chain continues to move, the actuator 38 thereon will momentarily trip first the limit switch 9LS and then the limit switch 8LS. As the contact of the limit switch 9LS is closed by the actuator control relay 5CR is energized to close its contact 5CR-2 to supply power to solenoid SOL-1. As solenoid SOL-1 is energized, its plunger forces the pressure roller 195 attached thereto, through linkage previously described, against the scan bar 127 of the film carriage to force it into frictional contact with the continually rotating roller 128 to effect a scan cycle. As an image is scanned an electrostatic latent image is formed on the drum, developed, and then as this portion of the drum passes through the transfer station the xerographic powder image is transferred from the drum to the sheet of transfer material which initiated the xerographic opeartion. The paper is fed by the paper conveyor in timed relation to the movement of the drum so that the paper is delivered to the drum to coincide with the image formed thereon.

As the normally closed end-of-scan limit switch 7LS on the carriage 105 contacts the end-of-scan limit plate 152, the switch is depressed to break the circuit to control relay 4CR and relay 5CR thereby de-energizing solenoid SOL-1 and lamp LMP-3. With the release of the solenoid SOL-1, the carriage of the optical scanning mechanism is free to be returned to its starting position by the biasing action of the return spring 143, thereby releasing limit switch 7LS to re-energize lamp LMP-2 through the closed contact 5CR-1B.

In the meantime the paper conveyor will forward the paper with the transferred xerographic powder image thereon to the heat fuser where the powder forming the image on the paper is permanently fixed thereto, and then the paper is forwarded to the delivery rollers 47 and 48 which grip the paper as it is released by the gripper bar to discharge the paper into the tray.

The chain conveyor will continue to operate until an actuator 38 thereon depresses the end-of-scan limit switch 4LS. As the end-of-scan limit switch 4LS is closed, timer 2TR and control relay 3CR are energized, the latter thereby opening its normally closed contact 3CR-A to de-energize clutch SC-2 which disengages the drive to the paper conveyor stopping it with a gripper bar thereon in position over limit switch 5LS to receive the next sheet of support material. At the same time lamp LMP-1 is energized to indicate to the operator that the machine is ready to start another xerographic processing cycle.

At this time the operator may insert another sheet of paper to initiate another reproduction cycle starting with the closure of limit switch 5LS as just described. If so desired he may also wish to make a reproduction on a duplicating master in lieu of paper as a support material. To do this switches SW-3 and SW-5 must be depressed to their master position in preparation for making a master reproduction. Switch SW-5 is a mechanically interlock two-position push button switch used to connect the resistance element R-3 into the circuit. This additional resistance element is required because it is necessary to supply more heat to fuse a powder image on a duplicating master than on an ordinary sheet of paper.

As previously described, switch SW-3 when pushed into the master position opens contact SW-3B and closes contact SW-3A which connects a limit switch 8LS in the circuit. The machine is now set to make a master in the same manner described above in relation to making xerographic reproductions on paper.

If, on the other hand, the machine is not used for a period of two minutes, the timer 2TR heats sufficiently to open its contact 2TR-A to de-energize the entire circuit. The timer 2TR requires a two-minute interval which is specifically chosen so that if the operator does not use the machine for a period of two minutes the machine will automatically shut down. The operator will not normally push the OFF button or switch SW-2; he will just stop using the machine and it will turn itself off. However, the two-minute interval gives the operator sufficient time to change copies or to effect other supervisory operations before automatic shut-off. In the event of a malfunction, the OFF switch SW2 is provided on the control panel to enable the operator to stop the machine immediately.

Limit switch 6LS, previously described only in relation to its normally closed contact 6LS-B, is a switch normally actuated by the operator to enable him to view a frame or frames on a web of microfilm without necessarily initiating a complete xerographic reproduction cycle. Thus if the operator wishes to scan the web of microfilm to locate a particular frame desired and then to center this frame on the film carriage the operator need only depress the limit switch to close its contact 6LS-A by moving the carrier lever 250 on the projector to the right, to energize the projector lamp LMP-3 to permit the operator to view the projected image on the viewing platen 3. Closure of contact 6LS-A energizes lamp LMP-3 through control relay 4CR and its contact 4CR-2.

While the invention has been described with reference to the structures disclosed herein, it is not confined to the details set forth, and this application is intended to cover such modifications or changes as may come within the purposes of the improvements or the scope of the following claims.

What is claimed is:

1. A xerographic reproducing apparatus including a frame, a xerographic drum journaled in said frame, charging means positioned to place a uniform electrostatic charge on said xerographic drum, a projector mounted on said frame, said projector having an optical projection means and a copy carriage assembly for supporting copy to be reproduced, said copy carriage assembly being adapted to traverse the optical path of said optical projection means whereby any image of the copy is projected onto said xerographic drum to form an electrostatic latent image thereon, developing means positioned to develop an electrostatic latent image on said drum, a sheet conveyor for conveying a sheet of transfer material to said xerographic drum, transfer means positioned to effect transfer of a developed image from said xerographic drum onto a sheet of transfer material, drive means connected to said xerographic drum for effecting rotation thereof and connectable to said copy carriage assembly and said sheet conveyor, means for connecting the sheet conveyor to the drive means to effect feeding of a sheet of transfer material, and means actuated by said sheet conveyor for connecting the copy carriage assembly to said drive means in timed relation to the feeding of a sheet of transfer material to said xerographic drum.

2. A xerographic reproducing apparatus including a frame, a xerographic plate journaled for rotation in said frame, charging means positioned to place a uniform electrostatic charge on said xerographic plate, a projector mounted on said frame, said projector having an optical projection means and a copy carriage assembly for supporting copy to be reproduced, said copy carriage being adapted to traverse the optical path of said optical projection means whereby an image of a copy carried by said copy carriage assembly is projected onto said xerographic plate to form an electrostatic latent image thereon, developing means positioned to develop an electrostatic latent image on said xerographic plate, a sheet conveyor adapted to receive a sheet of transfer material and to convey it to said xerographic plate, transfer means positioned to effect transfer of a developed image from said xerographic plate onto a sheet of transfer material carried by said sheet conveyor, drive means connected to said xerographic plate for rotating said xerographic plate at a predetermined speed, a first clutch means for connecting said copy carriage assembly to said drive means, a second clutch means for connecting said sheet conveyor to said drive means, a first control means to actuate said second clutch means to connect said drive means to said sheet conveyor to effect feeding of a sheet of transfer material, and a second control means actuated by said sheet conveyor to effect operation of said first clutch means whereby said drive means is coupled to said copy carriage assembly to move said copy carriage means in timed relation to the movement of said xerographic plate and to the feeding of a sheet of transfer material to said xerographic plate by said sheet conveyor.

3. A xerographic reproducing apparatus including a xerographic plate journaled for rotation, charging means positioned to place a uniform electrostatic charge on said xerographic plate, a projector mounted adjacent said xerographic plate, said projector including a holder for copy to be reproduced, a lens means and scan control means to move said copy holder relative to said lens means whereby an image of a copy carried by said holder for copy is projected onto said xerographic plate to form an electrostatic latent image thereon, developing means positioned to develop an electrostatic latent image on said xerographic plate, a sheet conveyor adapted to receive a sheet of transfer material and to convey it to said xerographic plate, transfer means positioned to effect transfer of a developed image from said xerographic plate onto a sheet of transfer material carried by said sheet conveyor, drive means connected to said xerographic plate for rotating said xerographic plate at a predetermined speed, a clutch means for connecting said sheet conveyor to said drive means, control means to actuate said clutch means to connect said drive means to said sheet conveyor to effect feeding of a sheet of transfer material, and means actuated by said sheet conveyor to effect operation of said scan control means whereby said drive means is coupled to said holder for copy to move a copy relative to said lens means in timed relation to the movement of said xerographic plate and to the feeding of a sheet of transfer material to said xerographic plate by said sheet conveyor.

4. A xerographic reproducing apparatus including a frame, a xerographic plate journaled for rotation in said frame, charging means positioned to place a uniform electrostatic charge on said xerographic plate, a projector mounted on said frame, said projector having an optical projection means and a copy carriage assembly for supporting copy to be reproduced, said copy carriage assembly being adapted to traverse the optical path of said optical projection means from a start of scan position to an end of scan position whereby an image of a copy carried by said copy carriage assembly is projected onto said xerographic plate to form an electrostatic latent image thereon, developing means positioned to develop an electrostatic latent image on said xerographic plate, a sheet conveyor adapted to receive a sheet of transfer material and to convey it into contact with said xerographic plate, transfer means positioned to effect transfer of a developed image from said xerographic plate onto a sheet of transfer material carried by said sheet conveyor, drive means connected to said xerographic plate for rotating said xerographic plate at a predetermined speed, a first clutch means for connecting said copy carriage means to said drive means, a second clutch means for connecting said sheet conveyor to said drive means, a first control means to actuate said second clutch means to connect said drive means to said sheet conveyor, and a second control means actuated by said sheet conveyor to effect operation of said first clutch means whereby said drive means is coupled to said copy carriage assembly to move said copy carriage means from its start of scan position to its end of scan position in timed relation to the movement of said xerographic plate and to the feeding of a sheet of transfer material to said xerographic plate by said sheet conveyor, and means connected to said copy carriage assembly to effect return of said copy carriage means from its end of scan position to its start of scan position.

5. A xerographic reproducing apparatus including a xerographic plate journaled for rotation, charging means positioned to place a uniform electrostatic charge on said xerographic plate, a projector mounted adjacent said xerographic plate, said projector including an optical projection means and a copy carriage assembly for supporting copy to be reproduced, said copy carriage assembly being adapted to traverse the optical path of said optical projection means whereby a flowing image of a copy carried by said copy carriage assembly is projected onto said xerographic plate to form an electrostatic latent image thereon; developing means positioned to develop an electrostatic latent image on said xerographic plate, a sheet feeding mechanism, said sheet feeding mechanism including an endless chain conveyor adapted to travel from a sheet receiving station to said xerographic plate and then to a sheet delivery station at least one paper gripper connected to said endless chain conveyor along a line perpendicular to the path of travel of said endless chain conveyor, and cam means positioned adjacent to said sheet receiving station and to said sheet delivery station to actuate said paper gripper to receive a sheet of transfer material at said sheet receiving station and to release a sheet of transfer material carried by said paper gripper at said sheet delivery station; transfer means positioned adjacent said xerographic plate to effect transfer of a developed image from said xerographic plate onto a sheet of transfer material carried by said sheet gripper, delivery rollers positioned adjacent said delivery station to forward a sheet of transfer material released from said paper gripper, drive means connected to said xerographic plate for rotating said xerographic plate at a predetermined speed, and to said delivery rollers for rotating said delivery rollers, a first clutch means for connecting said copy carriage assembly to said drive means, a second clutch means for connecting said endless chain conveyor to said drive means, a first control means to actuate said second clutch means to connect said drive means to said endless chain conveyor, and a second control means actuated by said endless chain conveyor to effect operation of said first clutch means whereby said drive means is coupled to said copy carriage assembly to move said copy carriage means in timed relation to the movement of said xerographic plate and to the feeding of a sheet of transfer material to said xerographic plate by said sheet feeding mechanism.

References Cited in the file of this patent

UNITED STATES PATENTS 2,843,084    Hayford  ---------------- July 15, 1958